United States Patent
Giffard

(10) Patent No.: US 6,407,700 B1
(45) Date of Patent: Jun. 18, 2002

(54) METHOD AND APPARATUS FOR AUTONOMOUSLY MEASURING IONOSPHERIC DELAY AND SINGLE-FREQUENCY, GPS TIME RECEIVER INCORPORATING SAME

(75) Inventor: Robin P. Giffard, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 9 days.

(21) Appl. No.: 09/731,079

(22) Filed: Dec. 5, 2000

(51) Int. Cl.[7] .............................................. H04R 7/185
(52) U.S. Cl. .............................. 342/357.12; 342/357.02
(58) Field of Search ........................ 342/357.12, 357.02, 342/357.06

(56) References Cited

U.S. PATENT DOCUMENTS 6,163,295 A * 12/2000 Nagasamy et al. ..... 342/357.01

OTHER PUBLICATIONS

Klobuchar, John A., "Design and Characteristics of the GPS Ionospheric Time Delay ALgorithm for SIngle Frequency Users", IEEE Position Location and Navigation Symposium, Las Vegas, NV, Nov. 1986, pp. 280–286.

Giffard, R. P., "Recovering UTS(USNO,MC) with Increased Accuracy using a FIxed L1–CA COde GPS Receiver"., presented at the 32nd Annual Precise Time and Time Interval (PTTI) System and Applications Meeting, Nov. 28, 2000.

Breakiron, Lee A.(Editor), "31st Annual Precise Time and Time Interval (PTTI) Systems and Applications Meeting", Dec. 7–9, 1999. pp. 405–418.

Cohen, Clark E. et al., "Estimation of Absolute Ionospheric Delay Exclusively through Single–Frequency GPS Measurements", Stanford University, 1992, pp. 325–330.

* cited by examiner

Primary Examiner—Thomas H. Tarcza
Assistant Examiner—Fred H Mull
(74) Attorney, Agent, or Firm—Ian Hardcastle

(57) ABSTRACT

The ionospheric delay of a GPS signal transmitted by a first satellite having an obliquity is measured autonomously and substantially in real-time by receiving a code range, a carrier phase range and a satellite elevation angle for each of at least two satellites. For each of the at least two satellites, a code-phase divergence between the code range and the carrier phase range is calculated, an obliquity is calculated from the satellite elevation angle and time derivatives of the code-phase divergence and of the obliquity are calculated. A zenith delay is calculated from the obliquities, the time-derivatives of the obliquities and the time-derivatives of the code-phase divergences of the at least two satellites. The ionospheric delay is calculated by multiplying the obliquity of the first satellite and the zenith delay.

22 Claims, 11 Drawing Sheets

METHOD AND APPARATUS FOR AUTONOMOUSLY MEASURING IONOSPHERIC DELAY AND SINGLE-FREQUENCY, GPS TIME RECEIVER INCORPORATING SAME

BACKGROUND OF THE INVENTION

The Global Positioning System (GPS) operated by the United States Department of Defense is composed of about 24 earth-orbiting satellites that contain precise atomic clocks. The satellites, which are programmed from the ground, transmit microwave signals modulated with navigational and timing information. A suitable receiver can calculate its geographical position after receiving and demodulating the microwave signals transmitted by four or more of these satellites. The receiver can also use the satellite signals to determine the time in either the timescale used by the GPS system or the official United States timescale, UTC (USNO, MC). The receiver can then generate an electrical output pulse at a convenient time or times, such as at each whole second.

The receiver uses the measured propagation times of the microwave signals from four or more satellites and the calculated positions of the satellites when the microwave signals were transmitted to calculate its position and the time. Any factor that modifies the propagation times of the microwave signals from the satellites to the receiver will introduce errors into the calculations performed by receiver. For example, if the signal from each satellite is delayed by 100 ns, then the time calculated by the receiver will also be delayed by 100 ns.

The microwave signals transmitted by the GPS satellites are significantly affected by their passage through the ionosphere. The ionosphere is a layer of the atmosphere at an elevation of 150–1,000 km that contains free electrons generated by ionizing radiation from the sun. The distribution and density of the free electrons at a given point in the ionosphere varies strongly with the time of day, the time of year, and the state of the solar sun-spot cycle. There is also a significant unpredictable variation due to fluctuations in solar activity. The ionosphere can typically delay the microwave signals from the satellites by up to 100 ns. The time signals generated by the GPS satellites are highly accurate and stable. Thus, a GPS receiver can potentially be used as a simple, low-cost local time standard. However, the unpredictability and variability of the ionospheric delay limits the accuracy and stability of the time the can be generated by a conventional GPS receiver.

GPS receivers exist that are capable of detecting microwave signals at both of the two widely-separated frequencies, L1 and L2, transmitted by the GPS satellites. Such receivers remove the effect of the ionospheric delay using the fact that the ionosphere imposes a group delay on the microwave signals that varies inversely with the square of the carrier frequency. However, the L2 ranging signal is currently encrypted and cannot easily be decoded by users who are not qualified by the United States Department of Defense. Some two-frequency receivers are available for non-qualified users, but they are considerably more expensive, and somewhat less reliable, than single-frequency receivers. Accordingly, many users have single-frequency receivers that can receive only the L1 signal.

Single-frequency receivers usually include a correction for the ionospheric delay based on an ionosphere model that is built into the GPS system. This model is expected to remove about 50% of the ionosphere effect, on average. Since the parameters of the model are estimated in advance and are then transmitted to the GPS satellites, it cannot anticipate day-to-day random fluctuations, and cannot be completely accurate. Alternatively, various organizations make detailed and accurate models of the ionosphere based on GPS observations. However, these models are not available simply, or in real-time.

What is needed, therefore, is a way of autonomously measuring the ionospheric delay of a signal transmitted by a satellite. The ability to measure the ionospheric delay autonomously would enable a single-frequency GPS time receiver to generate a highly-accurate time signal that is not subject to the inaccuracies that result from the limited performance of the conventional built-in ionosphere model.

SUMMARY OF THE INVENTION

The invention provides a method for measuring, autonomously and substantially in real-time, an ionospheric delay of a GPS signal transmitted by a first satellite having an obliquity. In the method, a code range, a carrier phase range and a satellite elevation angle for each of at least two satellites are received. For each of the at least two satellites, a code-phase divergence between the code range and the carrier phase range is calculated, an obliquity is calculated from the satellite elevation angle, and time derivatives of the code-phase divergence and of the obliquity are calculated. A zenith delay is calculated from the obliquities, the time-derivatives of the obliquities and the time-derivatives of the code-phase divergences of the at least two satellites. The ionospheric delay is then calculated by multiplying the obliquity of the first satellite and the zenith delay.

A code range, a carrier phase range, a satellite elevation angle and additionally a satellite azimuth angle may be received for each of at least three satellites. In this case, for each of the at least three satellites, an offset longitude and an offset latitude are calculated from the elevation angle and the azimuth angle, and a time derivative of the offset longitude and a time derivative of the offset latitude are calculated. The zenith delay is calculated from the obliquities, the time-derivatives of the obliquities and the time-derivatives of the code-phase divergences of the at least three satellites, and additionally from the offset longitudes, the offset latitudes, the time derivatives of the offset longitudes and the time derivatives of the offset latitudes of the at least three satellites. A derivative of the zenith delay with offset longitude and a derivative of the zenith delay with offset latitude are calculated from the obliquities, the time-derivatives of the obliquities and the time-derivatives of the code-phase divergences, the offset longitudes, the offset latitudes, the time derivatives of the offset longitudes and the time derivatives of the offset latitudes of the at least three satellites. The ionospheric delay is then calculated from the zenith delay, the derivative of the zenith delay with offset longitude and the derivative of the zenith delay with offset latitude and additionally from the obliquity, the offset longitude and the offset latitude of the first satellite.

The autonomous ionospheric delay measuring method may be used in a method for generating, from GPS signals transmitted by a single satellite or by a set of P satellites, a corrected receiver clock bias signal corrected for ionospheric delay. The ionospheric delay measured by the autonomous ionospheric delay measuring method is used to correct the receiver clock bias signal. This correction enables the difference, characterized by the receiver clock bias, between a receiver time signal and the GPS system clock to be known more accurately.

The invention also provides an ionospheric delay measuring apparatus that operates autonomously and substantially in real-time to measure an ionospheric delay of a GPS signal transmitted by a first satellite and received by a GPS front end capable of receiving a GPS signal from each of at least two satellites and configured to calculate, from each GPS signal, a code range, a carrier phase range and a satellite elevation angle. The apparatus comprises a divergence and obliquity module for each of the at least two satellites, a zenith delay module and an ionospheric delay module.

Each divergence and obliquity module is connected to receive from the GPS front end the code range, the carrier phase range and the satellite elevation angle of one of the at least two satellites. Each divergence and obliquity module includes a code-phase divergence module, an obliquity module and time derivative modules. The code-phase divergence module is structured to calculate a code-phase divergence between the code range and the carrier phase range. The obliquity module is structured to calculate an obliquity from the satellite elevation angle. The time derivative modules are structured to calculate a time derivative of the code-phase divergence and a time derivative of the obliquity.

The zenith delay module receives the obliquities, the time-derivatives of the obliquities and the time-derivatives of the code-phase divergences of the at least two satellites and is structured to calculate a zenith delay from these quantities.

The ionospheric delay module calculates the ionospheric delay of the first satellite by multiplying the obliquity of the first satellite and the zenith delay.

The GPS front-end may be additionally capable of receiving a GPS signal from each of at least three satellites and may be structured additionally to calculate an azimuth angle from each GPS signal. In this case, the apparatus may include a divergence and obliquity module for each of the at least three satellites. Each divergence and obliquity module is additionally connected to receive the azimuth angle for one of the satellites from the GPS front end, and additionally includes an offset module and additional time derivative modules. The offset module calculates an offset longitude and an offset latitude from the elevation angle and the azimuth angle. The additional time derivative modules are structured to calculate a time derivative of the offset longitude and a time derivative of the offset latitude. In such apparatus, the zenith delay module is structured to calculate the zenith delay, a derivative of the zenith delay with offset longitude and a derivative of the zenith delay with offset latitude from the obliquities, the time-derivatives of the obliquities and the time-derivatives of the code-phase divergences of the at least three satellites, and additionally from the offset longitudes, the offset latitudes, the time derivatives of the offset longitudes and the time derivatives of the offset latitudes of the at least three satellites. Finally, the ionospheric delay module is structured to calculate the ionospheric delay from the zenith delay, the derivative of the zenith delay with offset longitude and the derivative of the zenith delay with offset latitude and additionally from the obliquity, the offset longitude and the offset latitude of the first satellite.

The autonomous ionospheric delay measuring apparatus may form part of a GPS time receiver in which the ionospheric delay measured by the autonomous ionospheric delay measuring apparatus is used to correct the receiver clock bias of the GPS time receiver.

DETAILED DESCRIPTION OF THE INVENTION

Figure 1A:
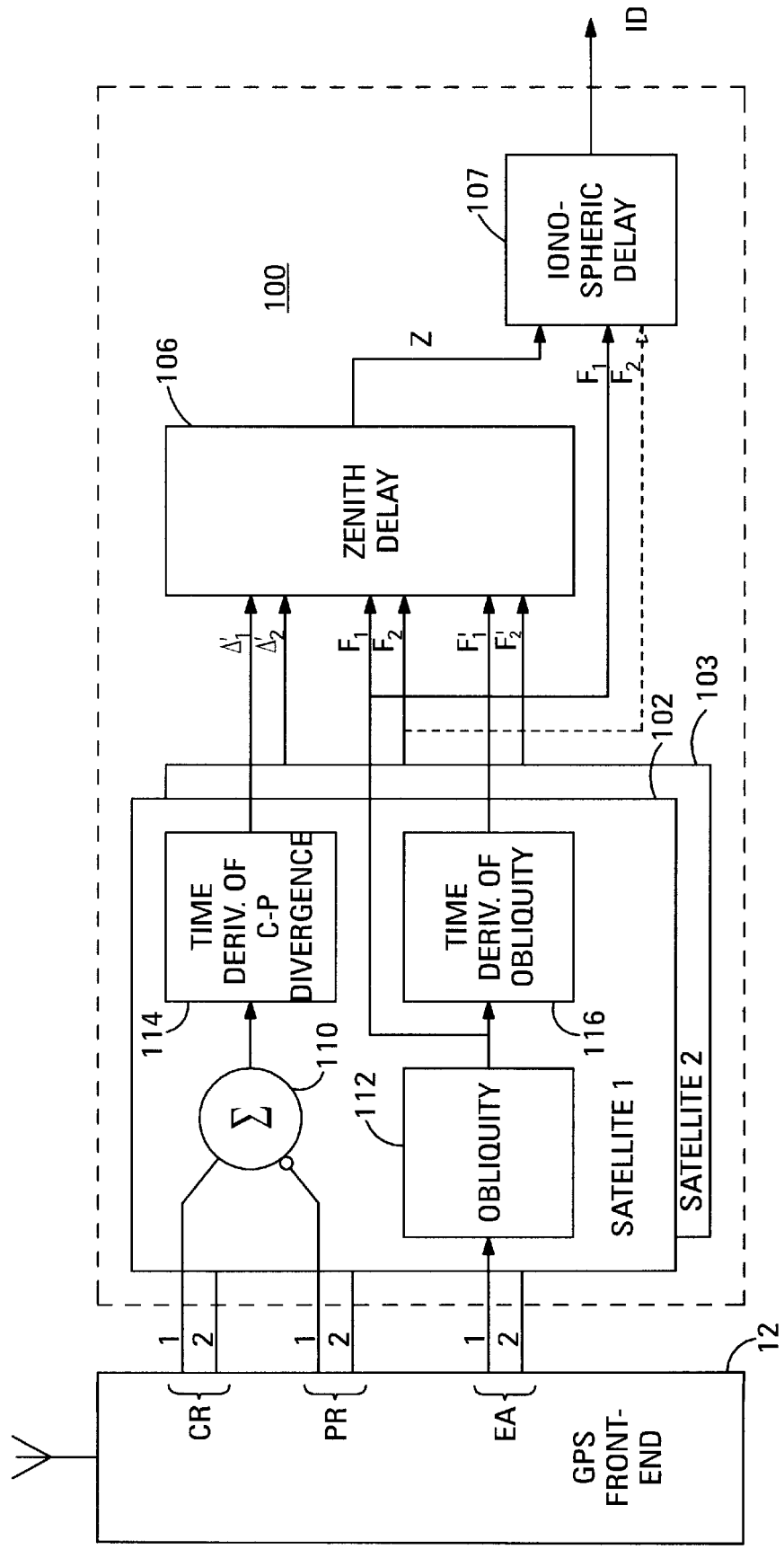
FIG. 1A is a block diagram of a first embodiment of an autonomous ionospheric delay measuring apparatus according to the invention.

The invention provides a method and apparatus for autonomously measuring the ionospheric delay of a signal transmitted by a satellite. The method and apparatus operate autonomously and substantially in real-time and can be used to measure the ionospheric delay of the signal transmitted by any one or more of the satellites tracked by the GPS time receiver. The ionospheric delay measurement can be used by the single-frequency GPS time receiver to enable it to generate a time signal that is more accurate than that generated by conventional single-frequency GPS time receivers.

The GPS L1 signal consists of a microwave carrier that is modulated with a pseudo-random code representing the time information. The code and carrier are synchronized at the time of their transmission by the satellite. The GPS L1 signals transmitted by up to twelve satellites can be received by a GPS receiver. The modulation on the GPS signal transmitted by each satellite includes a navigation message that enables the receiver to calculate the position of the satellite at the time the satellite transmitted the pseudo-random code. The navigation message additionally includes any correction necessary to align the satellite clock to GPS system time. The receiver uses the navigation message and the time at which it receives the pseudo-random code to calculate the propagation time of the satellite timing signal. The receiver then calculates the distance to the satellite by multiplying the propagation time by the velocity of light. The receiver performs this operation on the signals received from four or more satellites to calculate a distance and position for each of the satellites. The receiver then uses the distances and positions it has calculated for the four or more satellites to calculate its position and the time difference between its internal receiver clock and GPS system time.

In the GPS art, the term geometric range is used to denote the distance between a receiver and a satellite, the term code range is used to denote the distance between the receiver and the satellite determined using the pseudo-random code modulation, as described above, and the term phase range is used to denote the distance between the receiver and the satellite determined using the phase of the carrier.

The invention is based on the observation that the ionospheric delay changes the code range and the phase range in opposite directions. Thus, the difference between the code range and the phase range, which will be called the code-phase divergence, could theoretically be used to provide a measure of the ionospheric delay. In practice, however, the phase range determined by the GPS receiver is subject to an unknown constant offset because individual carrier cycles are indistinguishable. A measure of the ionospheric delay based on the code-phase divergence would therefore be subject to a similar uncertainty. The invention removes this uncertainty by using the time derivatives of the code-phase divergences of two or more satellites to provide a measure of the ionospheric delay and its time derivative. The time derivative of the code-phase divergence can easily be obtained from a time series of the measured code-phase divergences.

The ionosphere is typically modeled in the GPS art as a thin layer or "slab" at a characteristic height between 350 km and 450 km above the earth. This model has been found useful for the purpose of calculating ionospheric delays of GPS signals. The ionospheric delay is derived from the time derivative of the code-phase divergence as follows. The ionospheric delay experienced by the GPS satellite signal depends on the integral of the density of free electrons along the transmission path between the satellite and the receiver. In the above-described model of the ionosphere, the ionospheric delay can be approximated by multiplying the ionospheric delay that would be experienced by the signal from a satellite vertically above the receiver, which will be called the zenith delay, by the secant of the angle between the line of sight from the receiver to the satellite and the normal to the slab representing the ionosphere. This secant is known in the GPS art as the obliquity. The complete time derivative of the ionospheric delay therefore consists of the sum of two terms, namely, (a) the product of the zenith delay and the time derivative of the obliquity, and (b) the product of the zenith delay time derivative and the obliquity.

The GPS receiver continuously calculates the satellite elevation angle of each satellite that is being tracked. The obliquity and its time derivative can easily be derived from a series of values of the elevation angle by calculation or by using a look-up table. The GPS receiver additionally calculates the code range and the phase range of each satellite that is being tracked. From these measurements, the code-phase divergence and its time derivative can be calculated. The zenith delay and its time derivative are then calculated from the time derivative of the code-phase divergence, the obliquity and the time derivative of the obliquity for two or more satellites. Since two simultaneously-tracked satellites are unlikely to have the same ratio between their obliquities and the time derivative of their obliquities, the solution is usually well behaved. If the solution is not well-behaved, a different pair of satellites can easily be selected. The calculated zenith delay may additionally be smoothed using the time derivative of the calculated zenith delay to reduce noise in the calculated zenith delay. The calculated zenith delay is then multiplied by the obliquity of a given satellite to determine the ionospheric delay of the GPS signal transmitted by that satellite.

A more sophisticated procedure that takes account of the spatial variation of the zenith delay around the receiver can alternatively be used to determine the ionospheric delay, but more satellites are then needed for a solution, as will be described in more detail below.

In a typical GPS time receiver, a receiver clock generates a receiver time signal in response to the GPS signals received from the satellites tracked by the receiver. The GPS time receiver additionally generates a receiver clock bias that quantifies the measured difference between the receiver time signal and the GPS system clock. In a conventional GPS receiver, the receiver clock bias is subject to an error caused by ionospheric delays. The ionospheric delay measurement generated by the autonomous ionospheric delay measuring method and apparatus according to the invention can be used to correct the receiver clock bias to enable the GPS receiver to provide a time output of increased accuracy. To correct the receiver clock bias, the calculated zenith delay is multiplied by the obliquity for each of the satellites used to determine the receiver clock bias to determine an ionospheric delay for each of the satellites. The ionospheric delay is summed over all satellites used to determine the receiver clock bias, and is then subtracted from the receiver clock bias to generate the corrected receiver clock bias.

FIG. 1A is a block diagram showing a first embodiment 100 of an autonomous ionospheric delay measuring apparatus according to the invention. The apparatus autonomously measures the ionospheric delay of a signal transmitted by a satellite. The ionospheric delay measuring apparatus is shown connected to outputs of the GPS front end 12.

The ionospheric delay measuring apparatus 100 is composed of the divergence and obliquity modules 102 and 103, each of which calculates the obliquity, the time derivative of the obliquity and the time derivative of the code-phase divergence for one of the satellites currently being tracked by the GPS front end 12. The ionospheric delay measuring apparatus additionally includes the zenith delay module 106 that calculates the zenith delay and the ionospheric delay module 107 that calculates the ionospheric delay of the signal transmitted by any satellite whose obliquity is known. The ionospheric delay module is shown in FIG. 1A connected to receive the obliquities determined by the divergence and obliquity modules 102 and 103 and hence as measuring the ionospheric delays of the signals transmitted by the satellites whose obliquities are determined by divergence and obliquity modules 102 and 103.

The GPS front end 12 generates digital signals indicating the code range CR, the phase range PR and the elevation angle EA for each of the satellites that it is currently tracking. The code range, phase range and satellite elevation angle are three of the GPS parameters conventionally calculated by a GPS receiver. Each of the divergence and obliquity modules 102 and 103 receives from the GPS front end the code range CR, the phase range PR and the elevation angle EA for a different one of the satellites currently being tracked by the GPS front end. The two satellites will be called satellite 1 and satellite 2 on the understanding that these satellites may be any two of the GPS satellites currently being tracked by the GPS front end 12.

The divergence and obliquity module 102 will now be described in more detail. The divergence and obliquity module 102 receives the code range $CR_1$, the phase range $PR_1$ and the elevation angle $EA_1$ of satellite 1 from the GPS front end 12 and calculates the obliquity $F_1$, the time derivative $F'_1$ of the obliquity and the time derivative $\Delta'_1$ of the code-phase divergence for satellite 1. The divergence and obliquity module 103 is similarly structured and operates in a similar manner to the divergence and obliquity module 102, and will therefore not be described in detail. The divergence and obliquity module 103 receives the code range $CR_2$, the phase range $PR_2$ and the elevation angle $EA_2$ of satellite 2 from the GPS front end and calculates the obliquity $F_2$, the time derivative $F'_2$ of the obliquity and the time derivative $\Delta'_2$ of the code-phase divergence for satellite 2.

The divergence and obliquity module 102 is composed of the divergence module 110, the obliquity module 112 and the time derivative modules 114 and 116. The inputs of the time derivative modules 114 and 116 are connected to the outputs of the divergence module and the obliquity module, respectively.

The divergence module 110 has two inputs connected to the GPS front end 12, namely, a normal input connected to receive the satellite 1 code range and an inverting input connected to receive the satellite 1 phase range. The divergence module subtracts the phase range from the code range to generate a code-phase divergence, which it feeds to the time derivative module 114.

If the GPS front end 12 calculates the code-phase divergence and provides an output of the code-phase divergence, the divergence module 110 may be omitted and the code-phase divergence calculated by the GPS front end for satellite 1 may be fed directly to the input of the time derivative module 114.

The time derivative module 114 receives successive values of the code-phase divergence, calculates their time derivative and feeds the time derivative $\Delta_1'$ of the code-phase divergence of satellite 1 to an output connected to an input of the zenith delay module 106.

The obliquity module 112 has an input connected to the GPS front end 12 through which it receives the satellite 1 elevation angle $EA_1$. The obliquity module calculates the satellite 1 obliquity from the satellite 1 elevation angle.

The obliquity is the secant of the angle between the line of sight from the GPS front end 12 to satellite 1 and the normal to the ionospheric slab. The process for calculating the obliquity from the satellite elevation angle is a conventional geometrical calculation performed in the GPS art and will not be described here. The calculation is described by J. A. Klobuchar in Design and Characteristics of the GPS Ionospheric Time Delay Algorithm for Single Frequency Users, *IEEE POSITION, LOCATION, AND NAVIGATION SYMPOSIUM, LAS VEGAS*, Nev., 280–286 (1986). Either the full algorithm for a given height of the ionospheric slab, or the simplified algorithm described by Klobuchar may be used.

Many GPS front ends calculate the obliquities of the satellites they track as part of their conventional ionospheric delay correction, However, such GPS front ends rarely provide an output of the obliquities they calculate. If the GPS front end 12 provides an output of the obliquities it calculates, the obliquity module 112 may be omitted.

The obliquity module 112 feeds the obliquity $F_1$ of satellite 1 to the input of the time derivative module 116 and additionally to inputs of the zenith delay module 106 and the ionospheric delay module 107.

The time derivative module 116 receives successive values of the obliquity, calculates their time derivative and feeds the time derivative $F_1'$ of the obliquity of satellite 1 to an output connected to an input of the zenith delay module 106.

In a practical embodiment, the time derivative modules 114 and 116 employed linear regressions of length 2,400 seconds to estimate the time derivative of the code-carrier divergence and the time derivative of the obliquity, respectively. The obliquity was averaged over the same time interval. This means that satellites 1 and 2 are satellites that the GPS front end 12 has reliably tracked for more than 2,400 seconds.

Figure 2:
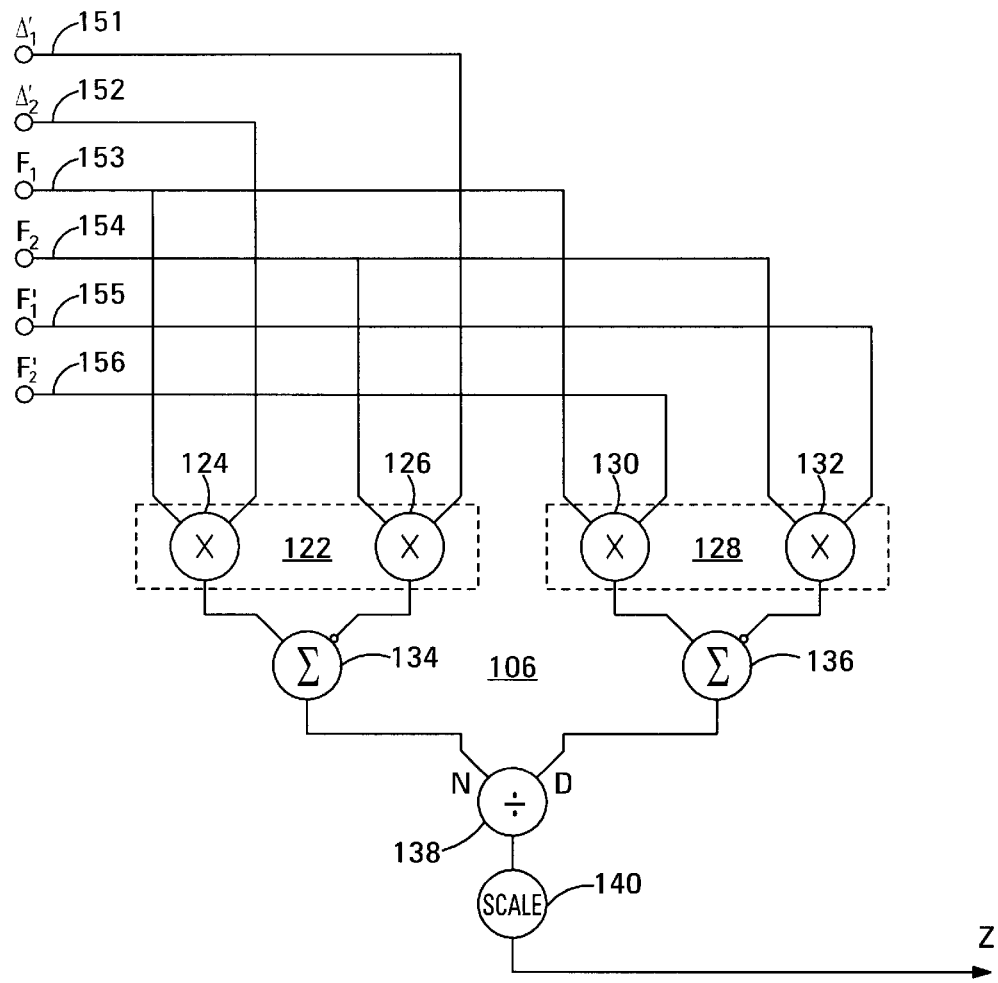
FIG. 2 is a block diagram of an example of the zenith delay module of the autonomous ionospheric delay measuring apparatus according to the invention.

FIG. 2 shows an example of the structure of the zenith delay module 106. The zenith delay module has inputs 151–156 connected to receive the obliquities $F_1$ and $F_2$, the time derivatives $F'_1$ and $F'_2$ of the obliquities and the time derivatives $\Delta'_1$ and $\Delta'_2$ of the code-phase divergences of the satellites 1 and 2, respectively, from the divergence and obliquity modules 102 and 103, respectively.

The zenith delay module 106 is composed of the first pair 122 of multiplying modules, composed of the multiplying modules 124 and 126, the second pair 128 of multiplying modules composed of the multiplying modules 130 and 132, the summing modules 134 and 136, the dividing module 138 and the scaling module 140. Each of the summing modules has a normal input and an inverting input. The dividing module has a numerator input and a denominator input.

In the first pair 122 of multiplying modules, the inputs of the multiplying module 124 are connected to the outputs of the divergence and obliquity modules 102 and 103 to receive the obliquity $F_1$ of satellite 1 and the time derivative $\Delta_2'$ of the code-phase divergence of satellite 2, respectively, and the inputs of the multiplying module 126 are connected to the outputs of the divergence and obliquity modules 102 and 103 to receive the time derivative $\Delta_1'$ of the code-phase divergence of satellite 1 and the obliquity $F_2$ of satellite 2, respectively. The outputs of the multiplying module 124 and the multiplying module 126 are connected to the normal input and the inverting input, respectively, of the summing module 134.

In the second pair 128 of multiplying modules, the inputs of the multiplying module 130 are connected to the outputs of the divergence and obliquity modules 102 and 103 to receive the obliquity $F_1$ of satellite 1 and the time derivative $F_2'$ of the obliquity of satellite 2, respectively, and the inputs of the multiplying module 132 are connected to the outputs of the divergence and obliquity modules 102 and 103 to receive the time derivative $F_1'$ of the obliquity of satellite 1 and the obliquity $F_2$ of satellite 2, respectively. The outputs of the multiplying module 130 and the multiplying module 132 are connected to the normal input and the inverting input, respectively, of the summing module 136.

The outputs of the summing modules 134 and 136 are connected to the numerator input N and the denominator input D, respectively, of the dividing module 138.

The output of the dividing module 138 is connected to the input of the scaling module 140. The output of the scaling module provides the zenith delay Z calculated from the GPS parameters of satellites 1 and 2.

Operation of the example of the zenith delay module 106 shown in FIG. 2 will now be described. The first pair 122 of multiplying modules receives the obliquities and the time derivatives of the code-phase divergence of satellites 1 and 2 and cross multiplies them to generate respective products as follows: the multiplying module 124 multiplies the obliquity of satellite 1 and the time derivative of the code-phase divergence of satellite 2 to generate a first product, and the multiplying module 126 multiplies the time derivative of the code-phase divergence of satellite 1 and the obliquity of satellite 2 to generate a second product. The summing module 134 receives the first product and the second product, inverts the sign of the second product and adds the first product and the sign-inverted second product to generate a first difference.

The second pair 128 of multiplying modules receives the obliquities and the time derivatives of the obliquities of satellites 1 and 2 and cross multiplies them to generate respective products as follows: the multiplying module 130 multiplies the obliquity of satellite 1 and the time derivative of the obliquity of satellite 2 to generate a third product, and the multiplying module 132 multiplies the time derivative of the obliquity of satellite 1 and the obliquity of satellite 2 to generate a fourth product. The summing module 136 receives the third product and the fourth product, inverts the sign of the fourth product and adds the third product and the sign-inverted fourth product to generate a second difference.

The dividing module 138 receives the first difference at its numerator input N and the second difference at its denominator input D. The dividing module divides the first difference by the second difference to generate a path length difference. The path length difference is dimensioned in meters and is proportional to twice the zenith delay.

The scaling module 140 multiplies the path length difference generated by the dividing module 138 by a scaling factor of 1.6677 ($=10^9/2c$, where c is the velocity of light). The scaling module converts the path length difference, which is dimensioned in meters and is proportional to twice the zenith delay, to generate the zenith delay Z, which is dimensioned in nanoseconds. Scaling modules can alternatively be located in series with the connection between the input 151 and the input of the multiplying module 126 and in series with the connection between the input 152 and the input of the multiplying module 124.

The zenith delay may be smoothed using the zenith delay time derivative $dZ/dt$ to increase the stability of the ionospheric delay determination. The equations that yield the zenith delay Z may be solved additionally to yield the zenith delay time derivative Z'. Accordingly, the zenith delay module 106 may include the structure shown in FIG. 2 to generate the zenith delay and may include an additional structure similar to that shown in FIG. 2 with its inputs 153–156 rearranged as shown in Table 1 to generate the zenith delay time derivative Z'. The inputs 151 and 152 of the additional structure are connected to receive the time derivatives $\Delta_1'$ and $\Delta_2'$, respectively, of the code-phase divergences.

TABLE 1

| Input | To Generate Z | To Generate Z' |
|-------|---------------|----------------|
| 153 | $F_1$ | $F'_1$ |
| 154 | $F_2$ | $F'_2$ |
| 155 | $F'_1$ | $F_1$ |
| 156 | $F'_2$ | $F_2$ |

Alternatively, an arrangement of gates (not shown) may be interposed between the outputs of the divergence and obliquity modules 102 and 103 and the inputs 153–156 of the structure shown in FIG. 2 to control the quantities fed to the inputs 153–156. The structure shown in FIG. 2 may then be operated in a time-multiplexed manner to generate sequentially both the zenith delay and the zenith delay time derivative.

When the zenith delay module 106 additionally generates the zenith delay time derivative Z', it additionally includes a filter that uses the zenith delay time derivative to smooth the zenith delay to generate the smoothed zenith delay $\overline{Z}$. When the zenith delay module includes a filter that generates the smoothed zenith delay, the smoothed zenith delay is fed to the ionospheric delay module 107 instead of the zenith delay.

Figure 3:
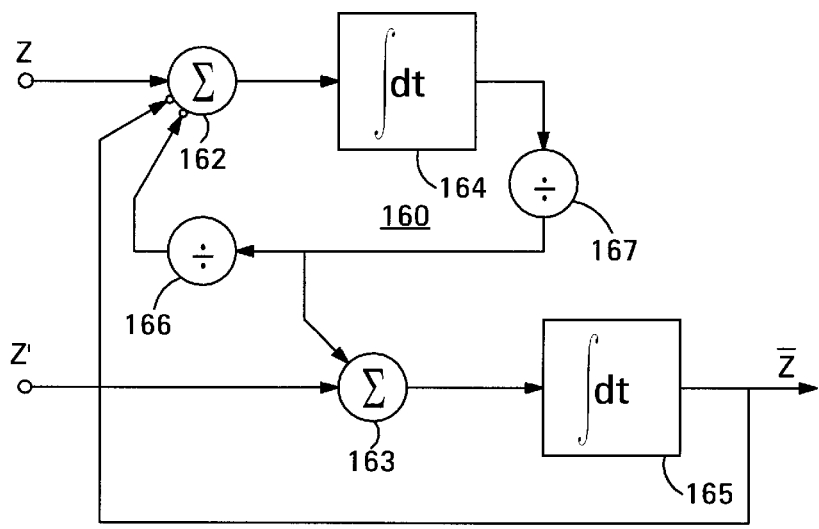
FIG. 3 is a block diagram of an example of a filter that may be used to smooth the zenith delay generated by the zenith delay module.

For example, the filter 160 shown in FIG. 3 may be used. A digital implementation of this filter is known in the GPS art as a Hatch, fading memory filter. The filter 160 is composed of the summing modules 162 and 163, the integrators 164 and 165 and the dividers 166 and 167.

The summing module 162 has a normal input connected to receive zenith delay Z, a first inverting input connected to the output of the integrator 165, and a second inverting input connected to the output of the divider 166. The output of the summing module 162 is connected to the input of the integrator 164. The output of the integrator 164 is connected to the input of the divider 167.

The output of the divider 167 is connected to the input of the divider 166 and to a first input of the summing module 163. A second input of the summing module 163 is connected to receive the zenith delay time derivative Z'. The output of the summing module 163 is connected to the input of the integrator 165. The output of the integrator 165 provides the smoothed zenith delay $\overline{Z}$ and is additionally connected to the first inverting input of the summing module 162, as described above.

The dividers 166 and 167 each divide their inputs by a fixed divisor.

Typical values of the division ratios are about $5.5 \times 10^{-4}$ and $7.7 \times 10^{-6}$, respectively. These division ratios provide the filter 160 with a time constant of about one hour.

The integrator 165 integrates the output of the summing module 163 to generate the smoothed zenith delay $\overline{Z}$. For times that are small compared with the time constant of the filter 160, the smoothed zenith delay $\overline{Z}$ output by the integrator 165 closely follows the integral of the zenith delay time derivative Z'. Feedback of the output of the integrator 164 ensures that the long-term average of the smoothed zenith delay $\overline{Z}$ is equal to the average of the zenith delay Z.

The smoothed zenith delay $\overline{Z}$ generated by the filter 160 may be fed to the ionospheric delay module instead of the zenith delay Z in any of the embodiments described in this disclosure. In the embodiment shown in FIG. 5, to be described below, the zenith delay time derivative Z' that is one input of the filter 160 is calculated by multiplying the derivative $dZ/d\lambda$ of the zenith delay with offset longitude by the rate of rotation of the earth $\Omega$.

Returning now to FIG. 1A, the ionospheric delay module 107 has a first input connected to the output of the zenith delay module 106, and a second input connected to receive the obliquity of the satellite whose ionospheric delay is to be measured. In the example shown in FIG. 1A, the second input of the ionospheric delay module is shown connected to the obliquity output of at least one of the divergence and obliquity modules 102 and 103. The ionospheric delay module 107 calculates the ionospheric delay $ID_i$ of the signal received from the satellite i whose ionospheric delay is to be measured by performing the following arithmetic operation on the zenith delay Z and the obliquity $F_i$ of satellite i:

$$ID_i = Z \times F_i.$$

In the example shown in FIG. 1A, the ionospheric delay module 107 is shown as receiving the obliquity $F_1$ of satellite 1 from the divergence and obliquity module 102. The ionospheric delay module performs the above arithmetic operation on the obliquity of satellite 1 and feeds the ionospheric delay $ID_1$ of the signal received from satellite 1 to at its output. The ionospheric delay module 107 may additionally or alternatively receive the obliquity $F_2$ of satellite 2 from the divergence and obliquity module 103 and may calculate the ionospheric delay $ID_2$ of the signal received from satellite 2 by performing the same arithmetic operation using the obliquity of satellite 2. In this case, the ionospheric delay module 107 feeds the ionospheric delay $ID_i$ of the signal received from either or both of satellite 1 and satellite 2 to its output.

Figure 1B:
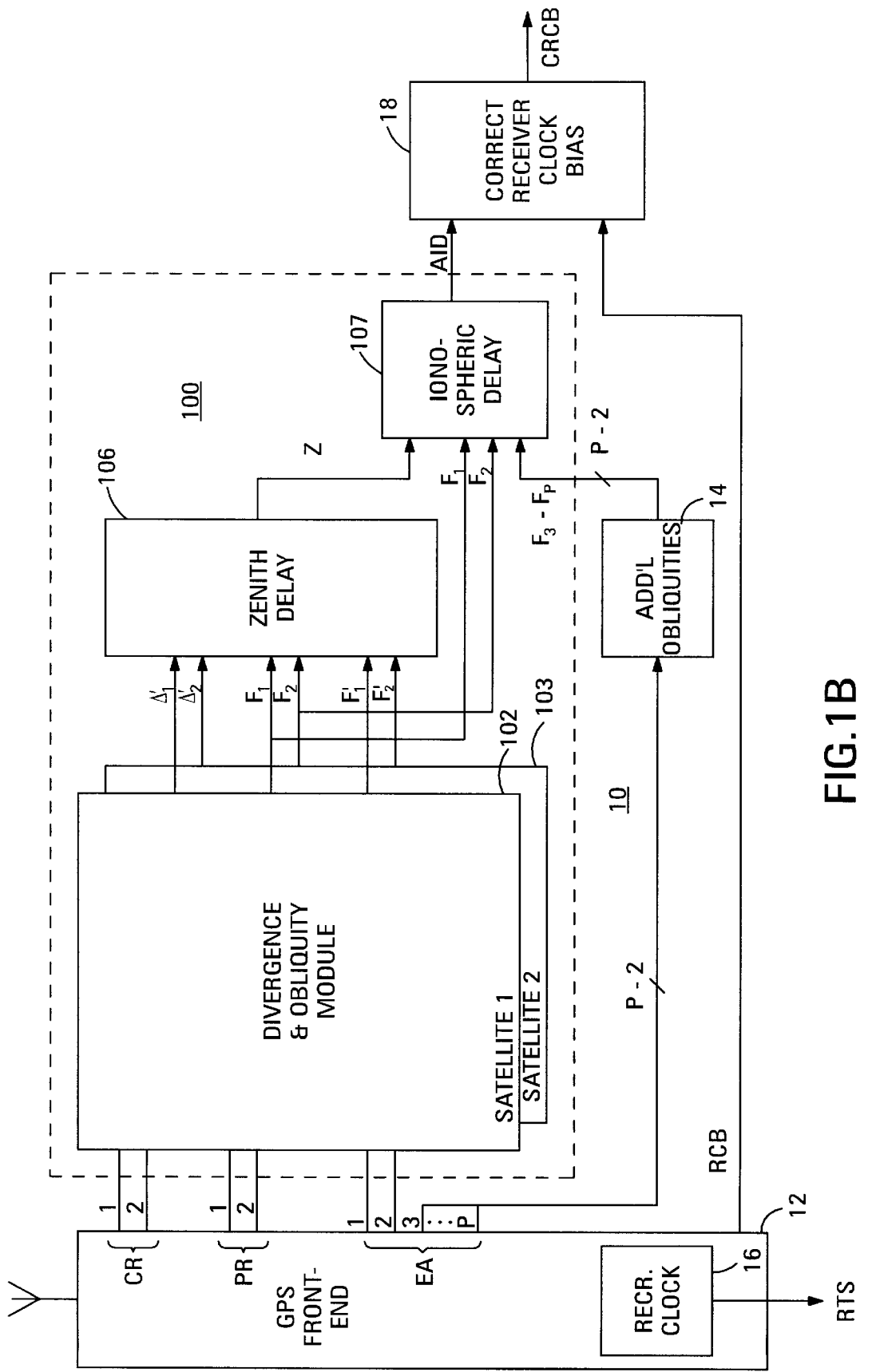
FIG. 1B is a block diagram of a first embodiment of a GPS time receiver according to the invention incorporating the first embodiment of the autonomous ionospheric delay measuring apparatus according to the invention.

FIG. 1B shows a first embodiment 10 of a GPS time receiver incorporating the autonomous ionospheric delay measuring apparatus 100 according to the invention. The autonomous ionospheric delay measuring apparatus 100 corrects the receiver clock bias RCB generated by the GPS front end 12 for the ionospheric delay of the GPS signals used to determine the receiver clock bias. This enables the difference between the receiver time signal RTS, also generated by the GPS front end, and the GPS system clock to be determined more accurately than in a conventional GPS time receiver.

The autonomous ionospheric delay measuring apparatus 100 is shown connected to the GPS front end 12. The GPS front end tracks M satellites and calculates a code range, a phase range and an elevation angle for each of them. The ionospheric delay measuring apparatus 100 receives from the GPS front end the code range, the phase range and the elevation angle for each of satellites 1 and 2, which are two of the M satellites.

The GPS front end 12 includes the receiver clock 16 that generates the receiver time signal RTS. In the example shown, the receiver time signal RTS is generated at the time at which the GPS front end measures the code and phase ranges of the satellites being tracked. The receiver time signal enables the user to determine the difference between of the receiver time signal and an external user clock.

The GPS front end 12 can additionally calculate a range residual for each of the P satellites included in the solution that determines the position of the GPS receiver and the time. The P satellites included in the solution are usually all of the M satellites tracked by the GPS front end, but may be a subset of the M satellites. The average of the range residuals is the measured difference between the receiver time signal RTS and the time according to the GPS system clock. The average of the range residuals is called the receiver clock bias. The receiver clock bias enables the user to correct the receiver time signal, and therefore to generate a local time signal synchronized to the GPS system clock.

The receiver clock bias is subject to an error caused by ionospheric delay of the GPS signals from which it is calculated. To correct the error in the receiver clock bias for the ionospheric delay, the GPS time receiver 10 additionally includes the receiver clock bias correction module 18. The receiver clock bias correction module corrects the receiver clock bias calculated by the GPS front end 12 using the average ionospheric delay AID calculated by the ionospheric delay module 107 for the P satellites included in the solution. The receiver clock bias correction module generates a corrected receiver clock bias CRCB that indicates the difference between the receiver time signal RTS generated by the receiver clock 16 and the GPS system clock. The corrected receiver clock bias is corrected for the ionospheric delays of the GPS signals from which it is generated and enables the user to generate a local time signal that is synchronized to the GPS system clock within about 10 ns.

To correct the receiver clock bias, the ionospheric delay module 107 operates to calculate the average ionospheric delay AID. The average ionospheric delay is the average of the ionospheric delays of the GPS signals of the P satellites included in the solution used to calculate the receiver clock bias. To calculate the average ionospheric delay, the obliquities of all P satellites included in the solution are required. Many GPS front ends calculate the obliquities of the P satellites included in the solution as part of their conventional ionospheric delay correction, but most do not provide an output of these obliquities. If the GPS front end 12 provides an output of the obliquities of all the satellites included in the solution, the obliquities are fed from the GPS front end to the second input of the ionospheric delay module 107. Otherwise, the obliquities for satellites 1 and 2 are available from the divergence and obliquity modules 102 and 103, and are fed to the second input of the ionospheric delay module. To generate the obliquities of the remaining satellites included in the solution, i.e., satellites 3 . . . P, the GPS time receiver 10 additionally includes the additional obliquities module 14. Alternatively, the additional obliquities module can calculate obliquities of all M satellites tracked by the GPS front end, although the obliquities of only the P satellites included in the solution are used.

The additional obliquities module 14 has inputs connected to the GPS front end 12 to receive the elevation angles calculated by the GPS front end for satellites 3 . . . P. The additional obliquities module has an output connected to the second input of the ionospheric delay module 107. The additional obliquities module calculates an obliquity for each of the satellites 3 . . . P and feeds the obliquities to the ionospheric delay module 107.

The above description is based on the assumption that satellites 1 and 2 are included in the solution used to calculate the receiver clock bias. It will be appreciated by the person of ordinary skill in the art that, if one or both of satellites 1 and 2 are not included in the solution, the additional obliquities module has to be configured to calculate more than P–2 additional obliquities.

The ionospheric delay module 107 calculates the average ionospheric delay AID for the P satellites included in the solution used to calculate the receiver clock bias RCB. The ionospheric delay module may calculate the average ionospheric delay by averaging the obliquities of the P satellites and multiplying the result by the zenith delay, i.e., $$AID = \left[\frac{1}{P}\sum_{i=1}^{P} F_i\right] \cdot Z.$$

Alternatively, the ionospheric delay module may calculate the average ionospheric delay by multiplying the obliquity of each of the P satellites by the zenith delay and averaging the results, i.e., $$AID = \frac{1}{P}\sum_{i=1}^{P} F_i Z.$$

The receiver clock bias correction module 18 has a first input connected to the output of the ionospheric delay module 107 and a second input connected to receive the receiver clock bias RCB from the GPS front end 12.

The output of the receiver clock bias correction module provides the corrected receiver clock bias CRCB.

The GPS front end 12 can calculate the receiver clock bias RCB from the time of arrival TOA, the time of transmission TOT, and the geometric range GR of each of the P satellites. The time of arrival and geometric range are two more of the GPS parameters conventionally calculated by a GPS receiver. The time of transmission is a GPS parameter conventionally received by a GPS receiver. The time of arrival is measured using the receiver clock 16 of the GPS time receiver 10. The time of transmission is defined in accordance with to the GPS system clock. The GPS front end calculates the receiver clock bias RCB by performing the following arithmetic operation:

$$RCB = \frac{1}{P}\sum_{i=1}^{P}\left[TOA_i - \left\{TOT_i + \frac{GR_i}{c}\right\}\right]$$

where c is the velocity of light.

Alternatively, the GPS front end 12 may calculate the receiver clock bias using a calculation in which the receiver geometric position is adjusted by iteration to minimize the variance of pseudorange residuals. The resulting clock bias is the same as that calculated by the method described above. The technique for obtaining the GPS position and time solution is known in the GPS art, and is described, for example, by P. Axelrad and R. G. Brown in GPS Navigation Algorithms, 1 Global Positioning System: Theory and Applications, eds. B. W. Parkinson and J. J. Spilker, 163 *PROGRESS IN ASTRONAUTICS AND AERONAUTICS*, 409–434.

Accurate GPS receivers additionally correct the measured ranges for the small delay caused by the troposphere. The correction is calculated for each satellite from the satellite elevation angle and the elevation of the receiver above the geoid.

The receiver clock bias RCB is subject to an error caused by the ionospheric delay, as described above. The GPS front end 12 feeds the receiver clock bias to the receiver clock bias correction module 18.

The receiver clock bias correction module 18 subtracts the average ionospheric delay AID from the receiver clock bias RCB to generate the corrected receiver clock bias CRCB and provides the corrected receiver clock bias to indicate the difference between the receiver time signal RTS and the GPS system clock.

It is often convenient to relate the receiver time signal RTS to a standard time scale different from the GPS system clock. For example, in the United States, it is convenient to relate the receiver time signal to the time scale UTC(UNSO, MC) because this time scale is the legal time scale for the United States. In this case, the GPS front end will use a simple linear equation with coefficients contained in the navigation message to adjust the value of the receiver clock bias. The time output of the GPS time receiver corrected using the corrected receiver clock bias CRCB is then referred to UTC(USNO, MC) rather than to the GPS system clock. The time scale ideally transmitted in this way is called UTC(USNO, MC) via GPS.

The GPS front end 12 conventionally uses its calculated position to determine the geometric range GR from each satellite when calculating the receiver clock bias RCB. A non-mobile GPS time receiver may be structured to perform a one-time determination of its global position and to store its position for use in calculating the receiver clock bias. Alternatively, a non-mobile GPS time receiver may be structured to receive, from an external source, data indicating its global position with greater accuracy. Relieving the GPS time receiver of the need to calculate its global position generally increases the accuracy with which it can calculate the geometric range from any satellite, and, hence, the accuracy with which it can determine the receiver clock bias.

When the position of the GPS time receiver 10 is accurately known, the GPS front end 12 can generate a value of the receiver clock bias as long as one or more satellites are being tracked. In the GPS art, this mode of operation is described as position-hold. Since a non-mobile embodiment of the GPS time receiver 10 can generate the corrected receiver clock bias by tracking only two satellites, such non-mobile embodiment can be simplified by omitting the additional obliquities module 14 and simplifying the ionospheric delay module 107.

In such a simplified, non-mobile embodiment, the GPS front end 12 generates the receiver clock bias RCB from the GPS parameters of satellite 1, for example, and the ionospheric delay module 107 calculates the ionospheric delay of satellite 1 by multiplying the zenith delay by the obliquity of satellite 1 received from the divergence and obliquity module 102. The receiver clock bias correction module 18 then subtracts the ionospheric delay of satellite 1 from the receiver clock bias for satellite 1 to generate the corrected receiver clock bias CRCB.

Additionally or alternatively, the GPS front end 12 may calculate the receiver clock bias from the GPS parameters of satellite 2, the ionospheric delay module 107 may calculate the ionospheric delay of satellite 2 and the receiver. clock bias correction module 18 may subtract the ionospheric delay of satellite 2 from the receiver clock bias for satellite 2 to generate the corrected receiver clock bias. When the receiver clock bias and the ionospheric delay of satellite 2 are additionally calculated, the receiver clock biases for satellite 1 and satellite 2 may be averaged, the ionospheric delays of satellite 1 and satellite 2 may be averaged and the corrected receiver clock bias may be calculated by subtracting the averages. Alternatively, the receiver clock bias module 18 may independently calculate two corrected receiver clock biases and then average them to generate the corrected receiver clock bias.

In any mobile GPS time receiver, the GPS front end has to track four or more satellites to determine the GPS parameters referred to above. The autonomous ionospheric delay correction apparatus according to the invention may use the GPS parameters of the four or more satellites, or of a subset of three or more of them, to increase the accuracy of the ionospheric delay calculated by the ionospheric delay module.

Figure 4:
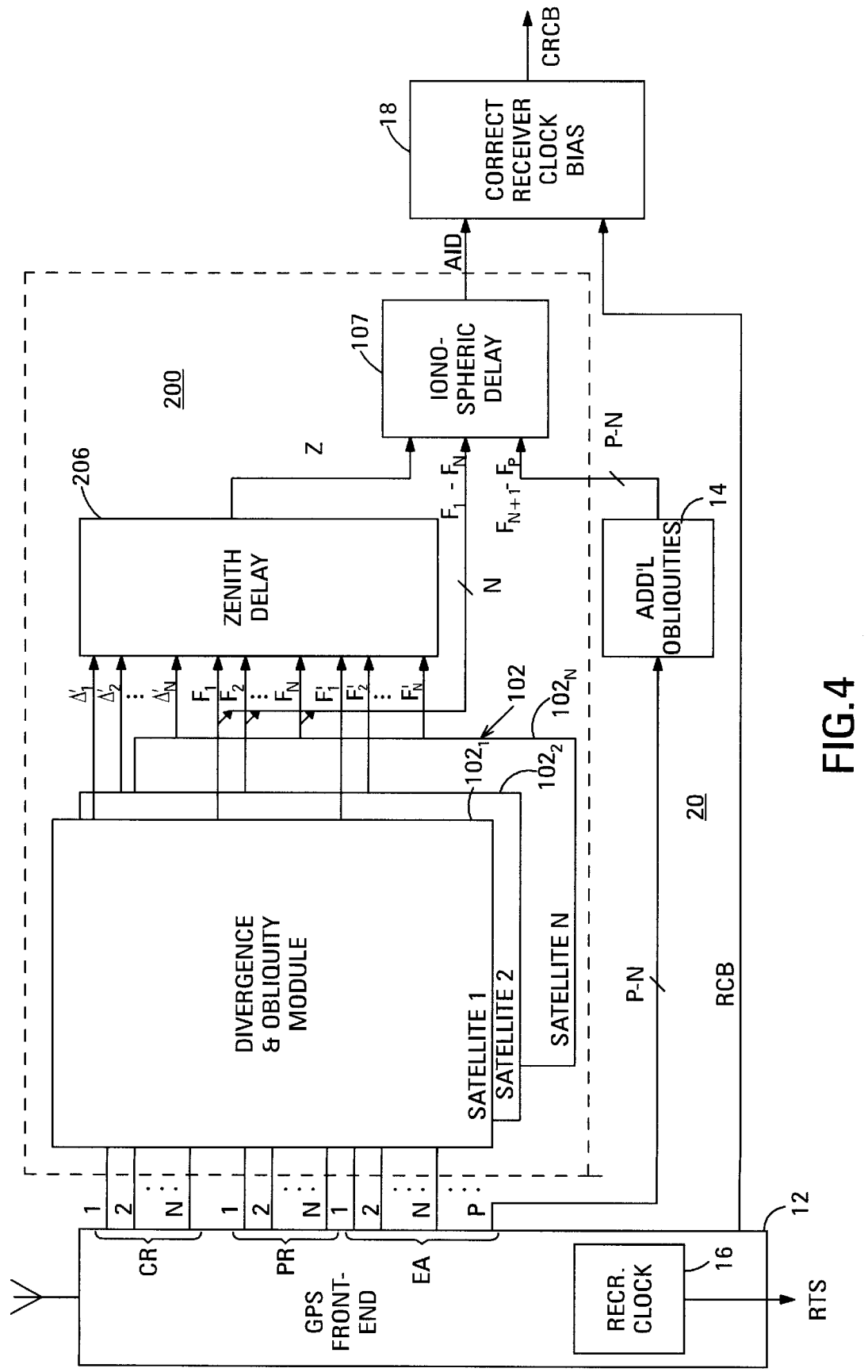
FIG. 4 is a block diagram of a second embodiment of a GPS time receiver according to the invention incorporating a second embodiment of an autonomous ionospheric delay measuring apparatus according to the invention.

FIG. 4 shows an example of a second embodiment 20 of a GPS time receiver 20 incorporating a second embodiment 200 of an autonomous ionospheric delay measuring apparatus according to the invention. Elements of the GPS time receiver and the autonomous ionospheric delay measuring apparatus shown in FIG. 4 that correspond to elements of the GPS time receiver and autonomous ionospheric delay measuring apparatus shown in FIG. 1 are indicated using the same reference numerals and will not be described in detail again.

The ionospheric delay measuring apparatus 200 includes the divergence and obliquity modules 102, one for each one of N satellites, where N is greater than three. In the example shown, the divergence and obliquity modules $102_1$, $102_2$, . . . , $102_N$ are indicated. The divergence and obliquity modules each receive the GPS parameters CR, PR and EA calculated by the GPS front end 12 from the signals received from one of the satellites 1, 2, . . . , N. The ionospheric delay measuring apparatus 200 may include one divergence and obliquity module for each one of all the M satellites that can be simultaneously tracked by the GPS front end 12, or may alternatively include one divergence and obliquity module for each one of a sub-set of the satellites that can be simultaneously tracked by the GPS front end. For example, four divergence and obliquity modules may be provided, one of each of the satellites judged by the GPS front end to have the most reliable signals. In this case N=4.

Each of the divergence and obliquity modules 102 calculates an obliquity, a time derivative of the obliquity and a time derivative of the code-phase divergence for the satellite whose GPS parameters it receives from the GPS front end 12. Each divergence and obliquity module forwards the obliquity, the time derivative of the obliquity and the time derivative of the code-phase divergence to the zenith delay module 206 and additionally feeds the obliquity to the ionospheric delay module 107.

The zenith delay module 206 uses a least-squares fitting method to solve N simultaneous equations that define the zenith delay and the zenith delay time derivative in terms of the obliquities, the time derivatives of the obliquities and the time derivatives of the code-phase divergences of the N satellites. Algorithms for performing the least-squares fitting method are known in the art and will not be described here. See, for example, W. H. Press, B. P. Flannery, S. A. Teukolsky, and W. T. Vetterling, *NUMERICAL RECIPES, THE ART OF SCIENTIFIC COMPUTING*, 509–520, Cambridge University Press, New York, (1986). For example, it will be apparent to a person of ordinary skill in the art that the vector processing scheme shown in FIGS. 6, 7A and 7B can be used with two variables instead of three to calculate the zenith delay and the zenith delay time derivative. Calculating both the zenith delay and the zenith delay time derivative enables a smoothed zenith delay to be calculated, as described above with reference to FIG. 3. The zenith delay calculated from the GPS parameters of three or more satellites has the potential to be more accurate than the zenith delay calculated by the embodiment shown in FIG. 1A.

The ionospheric delay module 107 receives the zenith delay Z from the zenith delay module 206, the obliquities $F_1$ . . . $F_N$ from the divergence and obliquity modules $102_1$ . . . $102_N$, respectively, and the obliquities $F_{N+1}$ . . . $F_P$ from the additional obliquities module 14. The ionospheric delay module then calculates the average ionospheric delay IAD from the zenith delay and the obliquities of the P satellites included in the solution used to calculate the receiver clock bias RCB. For example, for each of the P satellites, the ionospheric delay module 107 multiplies the zenith delay by the obliquity $F_i$ of the i-th satellite to obtain the ionospheric delay $ID_i$ of the signal received from the i-th satellite. The ionospheric delay module the averages the ionospheric delays of the P satellites and feeds the average ionospheric delay LAD to the receiver clock bias correction module 18.

As noted above, the ionospheric delay module 107 preferably uses the smoothed zenith delay $\overline{Z}$ instead of the zenith delay Z. However, the number of satellites N used to calculate the smoothed zenith delay $\overline{Z}$ need not be the same as the number of satellites P used to generate the receiver clock bias. For example when the number of satellites tracked by the GPS front end 12 is increasing, it will be possible to use some of them to calculate the corrected receiver clock bias before they have been tracked for sufficient time for them to be included in the calculation of the smoothed zenith delay $\overline{Z}$.

The GPS front end 12 calculates the clock bias RCB by either of the methods described above, or by any other suitable method, using the GPS parameters of each of the P satellites, and feeds the resulting receiver clock bias to the receiver clock bias correcting module 18.

The receiver clock bias correction module 18 subtracts the average ionospheric delay AID from the receiver clock bias RCB to generate the corrected receiver clock bias CRCB. The receiver clock bias correction module provides the corrected receiver clock bias as an indicator of the error between the receiver time signal RTS and the GPS system clock.

The above-described embodiments of the GPS time receiver and autonomous ionospheric delay measuring apparatus according to the invention are based on a model that assumes that the ionosphere is uniform in a region that encompasses the points where the lines of sight from the receiver to the satellites pass through the ionosphere. This assumption differs from reality. An embodiment in which the value of the free electron density, and, hence, the value of zenith delay, at the point where the line of sight to a given satellite passes through the ionosphere, are made dependent on latitude and longitude will now be described. For each satellite, the line of sight from the receiver passes through the ionosphere at a point whose longitude and latitude differ from those of the receiver by a longitude offset and a latitude offset, respectively. The longitude offset and the latitude offset can be calculated from the elevation angle and the azimuth angle of the satellite, and the assumed height of the ionosphere slab. The zenith delay at the point where the line of sight to a given satellite passes through the ionosphere will be called the offset vertical delay.

The variation of the free electron density with longitude is based on the assumption that most of the time-dependent variation of the free electron density is the result of the earth rotating under an ionosphere distribution whose free electron density in sun-fixed geocentric coordinates changes relatively slowly. As a result, the time derivative of the free electron density in earth-fixed geocentric coordinates is assumed to be equal to the rate of change of the free electron density with longitude multiplied by the rate of rotation of the earth.

Figure 5:
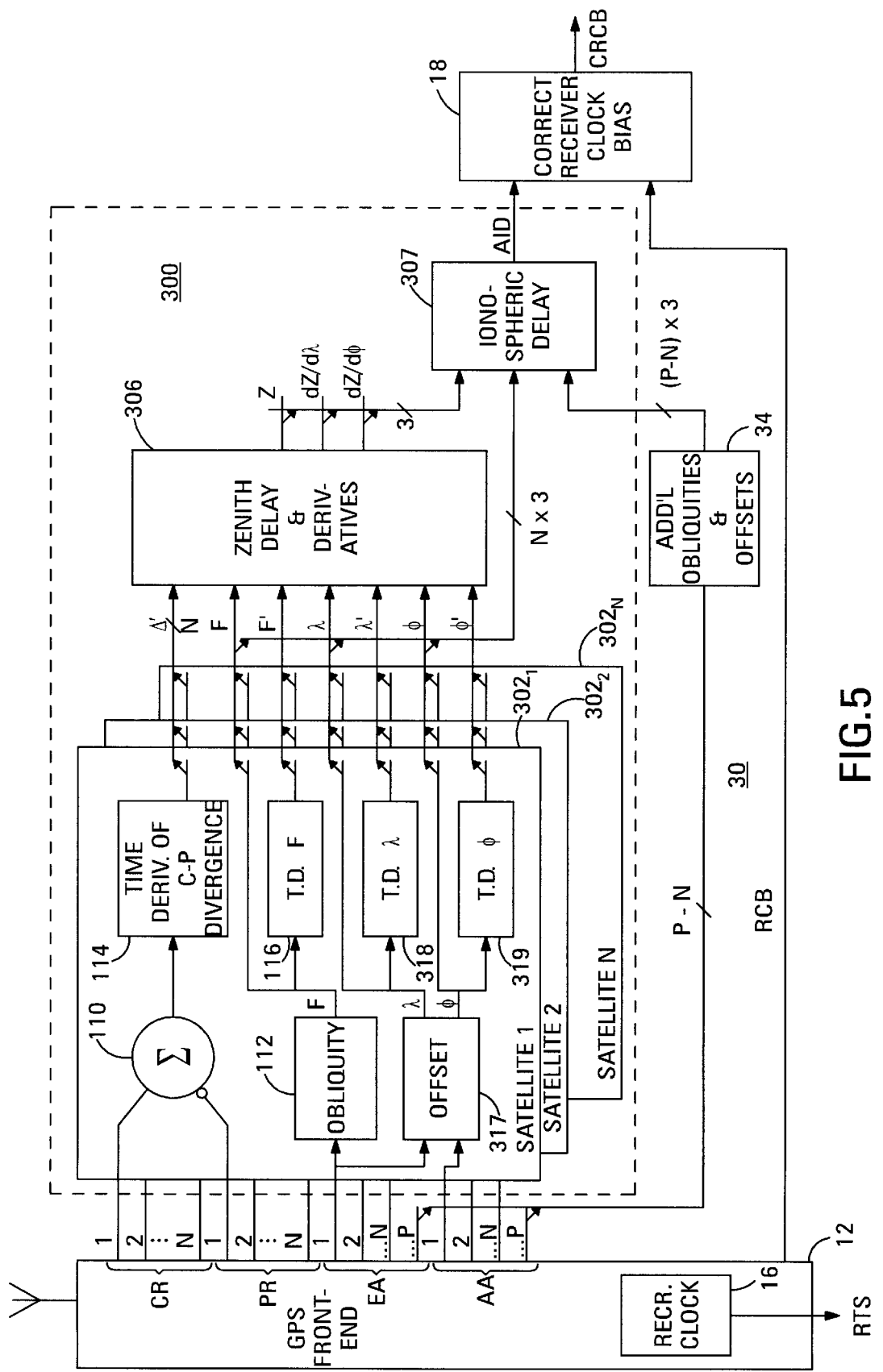
FIG. 5 is a block diagram of a third embodiment of a GPS time receiver according to the invention incorporating a third embodiment of an autonomous ionospheric delay measuring apparatus according to the invention.

FIG. 5 is a block diagram showing a third embodiment 30 of a GPS time receiver according to the invention incorporating a third embodiment 300 of an autonomous ionospheric delay correction apparatus according to the invention. This embodiment takes account of the variations of the local value of the free electron density and, hence, of the zenith delay, with latitude and longitude. Elements of the GPS time receiver and the autonomous ionospheric delay measuring apparatus shown in FIG. 5 that correspond to elements of the GPS time receivers and autonomous ionospheric delay correction apparatus shown in FIGS. 1A, 1B and 4 are indicated using the same reference numerals and will not be described in detail again here.

The GPS time receiver 30 is additionally composed of the GPS front end 12, the additional obliquities and offsets module 34 and the receiver clock bias correction module 18.

The ionospheric delay measuring apparatus 300 is composed of a divergence, offset and obliquity module $302_1$ and $302_N$, one for each of N of the satellites that are currently being tracked by the GPS front end. The value of N is at least three. Each of the divergence, offset and obliquity modules calculates the obliquity, the time derivative of the obliquity and the time derivative of the code-phase divergence for one of the N satellites, and additionally calculates the offset longitude, the time derivative of the offset longitude, the offset latitude and the time derivative of the offset latitude for the satellite. The ionospheric delay measuring apparatus additionally includes the zenith delay and derivatives module 306 that calculates the zenith delay Z and its offset derivatives, the ionospheric delay module 307 that calculates the average ionospheric delay for the P satellites included in the solution used to generate the receiver clock bias and the receiver clock bias correction module 18.

The GPS front end 12 generates digital signals indicating the code range CR, the phase range PR, the elevation angle EA and the azimuth angle AA for each of the satellites that it is currently tracking. The azimuth angle is another of the GPS parameters conventionally calculated by a GPS receiver. Each of the divergence and obliquity modules $302_1 \ldots 302_N$ receives from the GPS front end the code range $CR_i$, the phase range $PR_i$ the elevation angle $EA_i$ and the azimuth angle $AA_i$ for a different one i of N of the satellites currently tracked by the GPS front end.

The divergence, obliquity and offset module $302_1$ will now be described in more detail. The divergence, obliquity and offset module $302_1$ calculates the obliquity $F_1$, the time derivative of the obliquity $F_1'$, the time derivative of the code-phase divergence $\Delta_1'$, the offset longitude $\lambda_1$, the time derivative $\lambda_1'$ of the offset longitude, the offset latitude $\Phi_1$ and the time derivative $\Phi_1'$ of the offset latitude from the code range $CR_1$, the phase range $PR_1$, the elevation angle $EA_1$ and the azimuth angle $AA_1$ of satellite 1, which is one of the N satellites. The divergence, obliquity and offset modules $302_2 \ldots 302_N$ are similarly structured and operate in a similar manner to the divergence, obliquity and offset module $302_1$, and will therefore not be described in detail. The divergence, obliquity and offset modules $302_2 \ldots 302_N$ each calculate the obliquity, the time derivative of the obliquity, the time derivative of the code-phase divergence, the offset longitude, the time derivative of the offset longitude, the offset latitude and the time derivative of the offset latitude from the code range, the phase range, the elevation angle and the azimuth angle of a different one of satellites 2–N of the N satellites.

The divergence, obliquity and offset module $302_1$ is composed of the divergence module 110, the obliquity module 112, the offset module 317 and the time derivative modules 114, 116, 318 and 319. The inputs of the time derivative modules 318 and 319 are connected to an offset longitude output and an offset latitude output of the offset module, respectively.

The time derivative module 114 receives successive values of the code-phase divergence $\Delta_1$ of satellite 1, calculates their time derivative and feeds the time derivative $\Delta_1'$ of the code-phase divergence to an output connected to an input of the zenith delay and derivatives module 306.

The obliquity module 112 feeds the obliquity $F_1$ of satellite 1 to the input of the time derivative module 116 and additionally to inputs of the zenith delay and derivatives module 306 and the ionospheric delay module 307.

The time derivative module 116 receives successive values of the obliquity of satellite 1, calculates their time derivative and feeds the time derivative $F_1'$ of the obliquity of satellite 1 to an output connected to an input of the zenith delay and derivatives module 306.

The offset module 317 has inputs connected to the GPS front end 12 through which it receives the elevation angle EA and azimuth angle AA of satellite 1. The offset module calculates the satellite 1 offset longitude $\lambda_1$ and the satellite 1 offset latitude $\Phi_1$ from the elevation angle and the azimuth angle of satellite 1 and the assumed height of the ionospheric slab. The process for calculating the offset from the satellite elevation angle and azimuth angle is a conventional geometrical calculation performed in the GPS art and will not be described here. The calculation is described by C. E. Cohen, B. Pervan, and B. W. Parkinson in Estimation of Absolute Ionospheric Delay Exclusively through Single-Frequency GPS Measurements, *PROC. ION GPS*-92, 325–330, Institute of Navigation (1992). The offset module feeds the satellite 1 offset longitude $\lambda_1$ to the input of the time derivative module 318 and additionally to inputs of the zenith delay and derivatives module 306 and the ionospheric delay module 307. The offset module also feeds the satellite 1 offset latitude $\Phi_1$ to the input of the time derivative module 319 and additionally to inputs of the zenith delay and derivatives module 306 and the ionospheric delay module 307.

The time derivative module 318 receives successive values of the satellite 1 offset longitude $\lambda_1$, calculates their time derivative and feeds the time derivative $\lambda_1'$ of the offset longitude to an output connected to an input of the zenith delay and derivatives module 306.

The time derivative module 319 receives successive values of the satellite 1 offset latitude $\Phi_1$, calculates their time derivative and feeds the time derivative $\Phi_1'$ of the offset latitude to an output connected to an input of the zenith delay and derivatives module 306.

In a practical embodiment, the obliquity, and the offset longitude and the offset latitude were averaged over a time interval of 2,400 seconds, as were the time derivatives of the offset longitude and offset latitude. Again, this requires that the satellites be reliably tracked for more than 2,400 seconds before their average obliquities, offset longitudes and offset latitudes can be determined.

Figure 6:
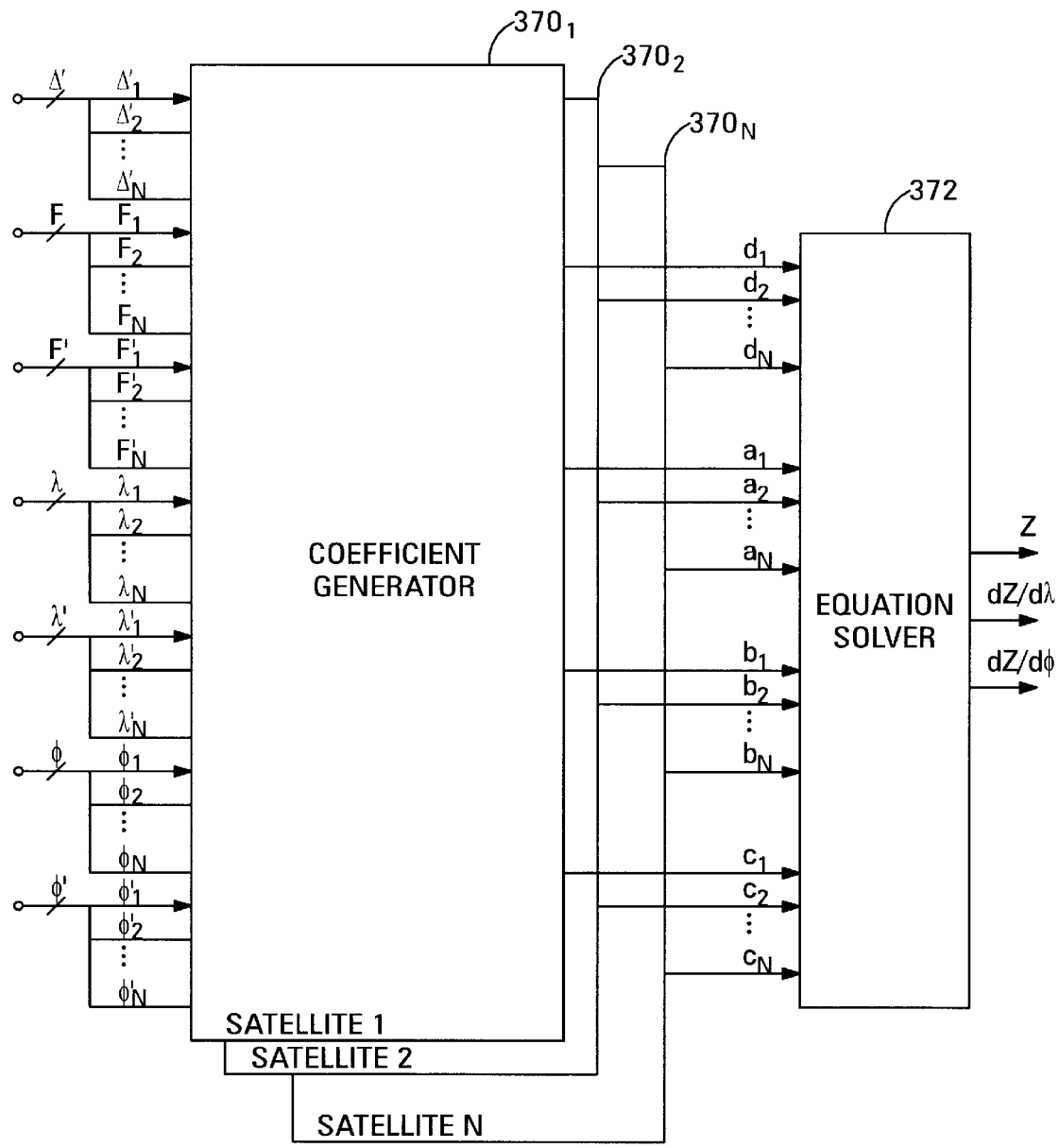
FIG. 6 is a block diagram of an example of the zenith delay and derivatives module of the third embodiment of an autonomous ionospheric delay measuring apparatus according to the invention.

FIG. 6 shows an example of the structure of the zenith delay and derivatives module 306. The zenith delay and derivatives module is composed of the coefficient generator modules $370_1 \ldots 370_N$, one for each one of the N of the satellites tracked by the GPS front end 12, and the equation solver module 372. Each of the coefficient generator modules $370_1 \ldots 370_N$ has inputs connected to the outputs of a corresponding one of the divergence, obliquity and offset modules $302_1 \ldots 302_N$ through which it receives the time derivative $\Delta'$ of the code-phase divergence, the obliquity F, the time derivative F' of the obliquity, the offset longitude $\lambda$, the time derivative $\lambda'$ of the offset longitude, the offset latitude $\Phi$ and the time derivative $\Phi'$ of the offset latitude of the respective satellite.

Each of the coefficient generator modules $370_1 \ldots 370_N$ generates a set of coefficients $a_i$, $b_i$, $c_i$, and $d_i$ for one equation whose variables are the zenith delay Z, the derivative $dZ/d\lambda$ of the zenith delay with offset longitude and the derivative $dZ/d\Phi$ of the zenith delay with offset latitude. The coefficient generator module feeds the set of coefficients to the equation solver module 372.

The equation solver module 372 has inputs connected to the outputs of the coefficient generator modules $370_1 \ldots 370_N$ through which it receives N sets of coefficients $a_i$, $b_i$, $c_i$, and $d_i$. When N=3, the equation solver solves three simultaneous equations, each with three variables, to calculate the zenith delay Z, the derivative $dZ/d\lambda$ of the zenith delay with offset longitude and the derivative $dZ/d\Phi$ of the zenith delay with offset latitude. When N is greater than three, the equation solver module uses a least squares fit method to solve N simultaneous equations, each with three variables, to calculate the zenith delay Z, the derivative $dZ/d\lambda$ of the zenith delay with offset longitude and the derivative $dZ/d\Phi$ of the zenith delay with offset latitude.

The equation solver module 372 has outputs through which it feeds the zenith delay Z, the derivative $dZ/d\lambda$ of the zenith delay with offset longitude and the derivative $dZ/d\Phi$ of the zenith delay with offset latitude to the ionospheric delay module 307.

Figure 7A:
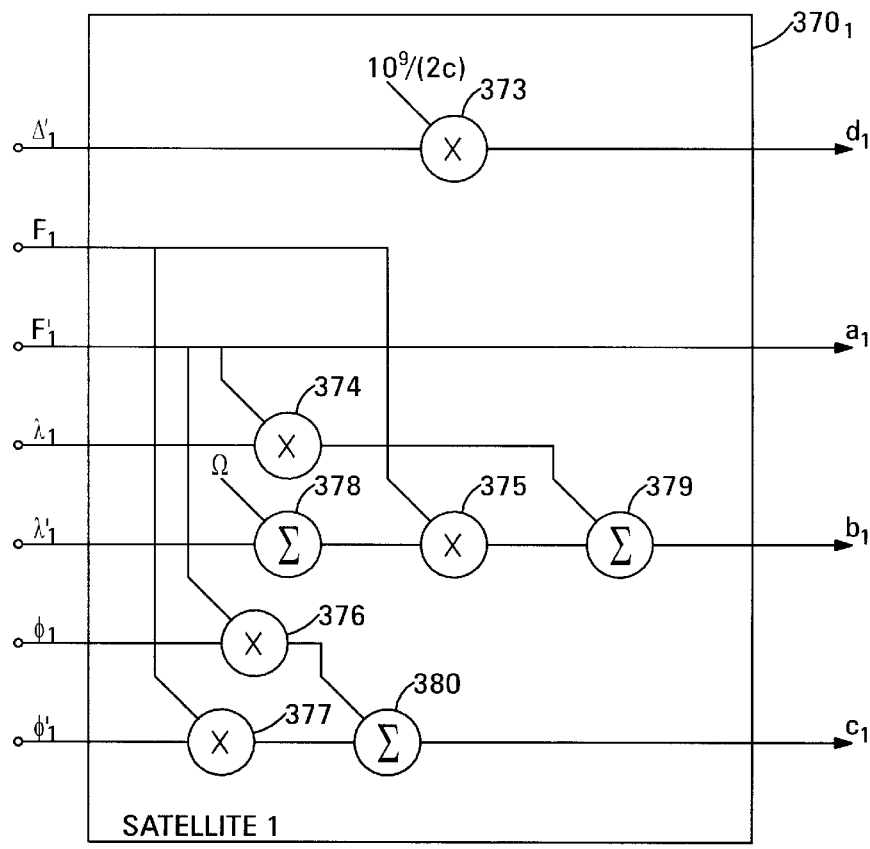
FIG. 7A is a block diagram of an example of the coefficient generator module of the zenith delay and derivatives module shown in FIG. 6.

The structure and operation of an example of the coefficient generator module $370_1$ will be described next with reference to FIG. 7A. The remaining coefficient generator modules $370_2 \ldots 370_N$ each have a similar structure and will not be described. The coefficient generator module $370_1$ has inputs through which it receives the time derivative $\Delta_1'$, of the code-phase divergence, the obliquity $F_1$, the time derivative $F'_1$, of the obliquity, the offset longitude $\lambda_1$, the time derivative $X'_1$ of the offset longitude, the offset latitude $\Phi_1$ and the time derivative $\Phi'_1$ of the offset latitude of satellite 1. The coefficient generator module $370_1$ has outputs through which it feeds the set of coefficients $a_1$, $b_1$, $c_1$ and $d_1$ to the equation solver module 372. The coefficient generator module $370_1$ is composed of the multiplying modules 373, 374, 375, 376 and 377 and the summing modules 378, 379 and 380.

The multiplying module 373 has inputs connected to receive the time derivative $\Delta'_1$ of the code-phase divergence and the constant $10^9/2c$, where c is the velocity of light, and an output that provides the coefficient d, to the equation solver module 372. The coefficient $d_1$ represents the time equivalent of one-half of the code-phase divergence of the signal received by the GPS front end 12 from satellite 1.

The multiplying module 374 has inputs connected to receive the time derivative $F'_1$ of the obliquity and the offset longitude $\lambda_1$, and an output connected to one input of the summing module 379.

The summing module 378 has inputs connected to receive the time derivative $\lambda'_1$ of the offset longitude and the constant $\Omega$, which quantifies the rate of rotation of the earth, and an output connected to one input of the multiplying module 375. The other input of the multiplying module 375 is connected to receive the obliquity $F_1$. The output of the multiplying module 375 is connected to the other input of the summing module 379. The output of the summing module 379 is connected to an input of the equation solver module 372 and provides the coefficient $b_1$ to the equation solver module.

The multiplying module 376 has inputs connected to receive the time derivative $F'_1$ of the obliquity and the offset latitude $\Phi_1$. The multiplying module 377 has inputs connected to receive the obliquity $F_1$ and the time derivative $\Phi'_1$ of the offset latitude. The outputs of the multiplying modules 376 and 377 are connected to the inputs of the summing module 380. The output of the summing module 380 is connected to an input of the equation solver module 372 and provides the coefficient $c_1$ to the equation solver module.

The coefficient generation module $370_1$ feeds the time derivative $F'_1$ of the obliquity to the equation solver module 372 as the coefficient $a_1$.

The structure and operation of an example of a first embodiment of the equation solver module 372 will now be described with reference to FIG. 7B. This embodiment uses a least squares fitting method to generate the zenith delay and its offset derivatives from N sets of coefficients, where N is greater than three. The equation solver module has N sets of four inputs. Each set of inputs is connected to the outputs of one of the coefficient generator modules $370_1 \ldots 370_N$ to receive the coefficients $a_i$, $b_i$, $c_i$ and $d_i$ generated by the respective coefficient generator. The equation solver module has outputs at which it provides the zenith delay, the derivative $dZ/d\lambda$ of the zenith delay with offset longitude and the derivative $dZ/d\Phi$ of the zenith delay with offset latitude.

The equation solver module 372 is composed of the matrix formation modules 382 and 383, the matrix transposition module 384, the matrix multiplying modules 385, 386 and 387, the matrix inversion module 388 and the output module 389.

The matrix formation module 382 has N inputs connected to receive the coefficients $d_1 \ldots d_N$ from the coefficient generating modules $370_1 \ldots 370_N$ and an output connected to one input of the matrix multiplying module 387.

The matrix formation module 383 has N sets of three inputs. Each set of inputs is connected to receive the coefficients $a_i$, $b_i$ and $c_i$ from a different one of the coefficient generating modules $370_1 \ldots 370_N$. The matrix formation module 383 has an output connected to the input of the matrix transposition module 384 and to one input of the matrix multiplying module 385.

The matrix transposition module 384 has an output connected to the other input of the matrix multiplying module 385 and to one input of the matrix multiplying module 386. The matrix multiplying module 385 has an output connected to the input of the matrix inversion module 388. The matrix inversion module 388 has an output connected to the other input of the matrix multiplying module 386.

The matrix multiplying module 386 has an output connected to the other input of the matrix multiplying module 387. The matrix multiplying module 387 has an output connected to the input of the output module 389. The output module 389 has three outputs through which it provides the zenith delay and the offset dependencies of the zenith delay.

The matrix formation module 382 forms the columnar matrix V from the coefficients $d_1 \ldots d_N$ and forwards the matrix V to the matrix multiplying module 387.

The matrix formation module 383 forms the two-dimensional matrix W composed of N×3 elements from the coefficients $a_1 \ldots a_N$, $b_1 \ldots b_N$ and $c_1 \ldots c_N$ received at its inputs and forwards the matrix W to the matrix transposition module 384 and the matrix multiplying module 385.

The matrix transposition module 384 transposes the matrix W received from the matrix formation module 383 and feeds the resulting transposed matrix $W^T$ to the matrix multiplying modules 385 and 386.

The matrix multiplying module 385 multiplies the matrix W received from the matrix formation module 383 and the transposed matrix $W^T$ received from the matrix transposition module 384 and forwards the resulting product $W^T W$ to the matrix inversion module 388.

The matrix inversion module 384 inverts the product matrix received from the matrix multiplying module 385 and feeds the resulting inverted matrix $[W^T W]^{-1}$ to the matrix multiplying module 386.

The matrix multiplying module 386 multiplies the transposed matrix $W^T$ received from the matrix transposing module 384 and the inverted matrix $[W^TW]^{-1}$ received from the matrix inverting module 388 and feeds the resulting product matrix $[W^TW]^{-1} W^T$ to the matrix multiplying module 387.

The matrix multiplying module 387 multiplies the product matrix received from the matrix multiplying module 386 and the matrix V received from the matrix formation module 382 and feeds the resulting column matrix $G=[W^TW]^{-1}W^TV$ to the output module 389.

The output module 389 feeds the elements of the matrix G, i.e., the zenith delay and its offset derivatives, to the ionospheric delay module 307.

The equation solver module 372 can alternatively be composed of multiplying modules, summing modules and dividing modules in a structure that is an extension of that shown in FIG. 2. An example of such an equation solver module is shown in FIG. 7C. The equation solver module solves the three simultaneous equations generated from the GPS parameters obtained from three satellites, i.e., N=3. Each of the equations has three variables.

The equation solver module 372 has the twelve inputs 147–158. The inputs are connected to the outputs of the coefficient generator modules $370_1$ ... $370_3$ to receive the coefficients $a_i$, $b_i$, $c_i$ and $d_i$ generated by the coefficient generator modules. The interconnections between the inputs and the coefficient generator modules will be described below with reference to Table 2. The equation solver module has an output at which it can provide the zenith delay, the derivative of the zenith delay with respect to offset longitude and the derivative of the zenith delay with respect to offset latitude, depending on the input connections.

the equation solver module 372 is composed of the multiplying modules 124, 126, 130, 132, the summing modules 134 and 136, and the dividing module 138 arranged as described above with reference to FIG. 2. However, one of the inputs of each of the multiplying modules 130 and 132 is connected to one of the inputs of the multiplying modules 124 and 126.

The equation solver module 372 is additionally composed of the set 142 of six summing modules and the set 144 of 12 multiplying modules. The out put of each of the summing modules in the set 142 is connected to a different one of the open inputs of the multiplying modules 124, 126, 130 and 132. The output of each of the multiplying modules in the set 144 is connected to a different one of the inputs of the summing modules in the set 142. The inputs of the multiplying modules are selectively connected to the equation solver module inputs 147–158 as shown in FIG. 7C.

TABLE 2

| Input | To Generate Z (col. 1) | To Generate dZ/dλ (col. 2) | To Generate dZ/dφ (col.3) |
|---|---|---|---|
| 150 | $a_1$ | $b_1$ | $c_1$ |
| 151 | $a_2$ | $b_2$ | $c_2$ |
| 152 | $a_3$ | $b_3$ | $c_3$ |
| 153 | $b_1$ | $a_1$ | $b_1$ |
| 154 | $b_2$ | $a_2$ | $b_2$ |
| 155 | $b_3$ | $a_3$ | $b_3$ |
| 156 | $c_1$ | $c_1$ | $a_1$ |
| 157 | $c_2$ | $c_2$ | $a_2$ |
| 158 | $c_3$ | $c_3$ | $a_3$ |

Three equation solver modules similar to the equation solver module 372 shown in FIG. 7C may be provided to generate the zenith delay and its offset derivatives in parallel. The three equation modules have identical structures but the inputs 150–158 of each module are connected to the outputs of one the coefficient generating modules $370_1$ ... $370_N$ in a different way, as shown in Table 2. FIG. 7C shows the quantities received at the inputs 147–158 of the equation module used to generate the zenith delay Z (see column 1 of table 2).

Alternatively, the equation solver module shown in FIG. 7C may be used alone to generate the zenith delay and its offset derivatives serially. In this case, an arrangement of gates (not shown) is interposed between the outputs of the coefficient generating modules $370_1$ ... $370_N$ and the inputs 150–158 of the equation solver module 372 to effect the input arrangements shown in Table 2. For each set of coefficients generated by the coefficient generating modules $370_1$ ... $370_N$, the equation solver module operates three times, once with the inputs 150–158 connected as shown in the column 1 of Table 2 and also as illustrated in FIG. 7C, to generate Z, once with the inputs 150–158 connected as shown in column 2 of Table 2 to generate dZ/dλ and once with the inputs 150–158 connected as shown in column 3 of Table 3 to generate dZ/dΦ.

Returning to FIG. 5, the zenith delay and derivatives module 306 feeds the zenith delay Z and its offset derivatives dZ/dλ and dZ/dΦ to one input of the ionospheric delay module 307.

The ionospheric delay module 307 additionally receives the obliquity, the offset longitude and the offset latitude of the satellite i whose ionospheric delay is to be measured. The ionospheric delay module calculates an offset vertical delay at the point at which the line of sight from the satellite i to the receiver passes through the ionosphere, and multiplies the offset vertical delay by the obliquity of the satellite to generate the ionospheric delay. In other words, the ionospheric delay module calculates the ionospheric delay $ID_i$ of the signal received from satellite i as follows:

$$ID_i = F_i\{Z + (\lambda_i \times dZ/d\lambda) + (\Phi_i \times dZ/d\Phi)\}$$

In this, the term in braces represents the offset vertical delay. The ionospheric delay module provides the ionospheric delay $ID_i$ as the output of the autonomous ionospheric delay measuring apparatus 300.

FIG. 5 shows the autonomous ionospheric delay measuring apparatus 300 forming part of the GPS time receiver 30. The GPS time receiver is additionally composed of the GPS front end 12, the additional obliquities and offset module 34 and the receiver clock bias correction module 18. In the GPS time receiver, the autonomous ionospheric delay measuring apparatus generates the average ionospheric delay for the P satellites included in the solution used to calculate the receiver clock bias of the receiver time signal generated by the receiver clock 16.

For the autonomous ionospheric delay measuring apparatus to calculate the average ionospheric delay, values of the obliquities and offsets of all P satellites included in the solution used to calculate the receiver clock bias are required. The GPS front end 12 may include outputs that provide these quantities, in which case the obliquities and offsets are fed from the GPS front end to the second input of the ionospheric delay module 307. Otherwise, the obliquities for satellites 1 ... N are fed from the divergence and obliquity modules $302_1$ ... $302_N$ to the second input of the ionospheric delay module, and the GPS time receiver 10 additionally includes the additional obliquities and offsets module 34 that generates obliquities and offsets for the remaining satellites included in the solution, i.e., satellites (N+1) . . . P. Alternatively, the additional obliquities and offsets module can calculate obliquities and offsets for all M satellites tracked by the GPS front end. However, the obliquities and offsets of only the P satellites included in the solution are used by the ionospheric delay module 307.

The additional obliquities module 34 has inputs connected to the GPS front end 12 to receive the elevation angles and azimuth angles calculated by the GPS front end for satellites (N+1) . . . P. The additional obliquities module has an output connected to the second input of the ionospheric delay module 307. The additional obliquities module calculates an obliquity, an offset longitude and an offset latitude for each of the satellites (N+1) . . . P and feeds the obliquities and offsets to the ionospheric delay module 307.

The above description is based on the assumption that satellites 1 . . . N are included in the solution used to calculate the receiver clock bias. It will be appreciated by the person of ordinary skill in the art that, if any of satellites 1 . . . N are not included in the solution, the additional obliquities and offsets module 34 has to be configured to calculate more than P–N additional obliquities and offsets.

The ionospheric delay module 307 calculates the average ionospheric delay AID for the P satellites included in the solution used to calculate the receiver clock bias RCB by performing the following arithmetic operation on the zenith delay, its offset derivatives and the offsets of the P satellites:

$$AID = \frac{1}{P}\sum_{i=1}^{P} F_i \left\{ Z + \lambda_i \cdot \frac{dZ}{d\phi} + \phi_i \cdot \frac{dZ}{d\lambda} \right\}.$$

The ionospheric delay module 307 feeds the average ionospheric delay AID the receiver clock bias correction module 18.

The receiver clock bias correction module 18 operates as described above to generate the corrected receiver clock bias CRCB.

The above-described embodiments 10, 20 and 30 of the GPS time receiver and of the autonomous ionospheric delay measuring apparatus 100, 200 and 300 may be constructed from discrete components, small-scale or large-scale integrated circuits, suitably-configured ASICs and other suitable hardware. Alternatively, portions of the GPS time receiver and autonomous ionospheric delay measuring apparatus may be constructed using an application-specific integrated circuit, digital signal processor, microprocessor, microcomputer or computer with internal or external memory operating in response to a program fixed in a computer-readable medium. In computer-, DSP- and ASIC-based embodiments, the various circuit elements shown herein may be ephemeral, and may only exist temporarily as the program executes. In such embodiments, the program could be conveyed to the hardware on which it is to run by embodying the program in a suitable computer-readable medium, such as a set of floppy disks, a CD-ROM, a DVD-ROM, a read-only memory or could be transmitted to such hardware by a suitable data link.

A set of multiple, similar processing modules shown in this disclosure as operating in parallel may be replaced by a single processing module that sequentially performs the processing performed by each of the multiple processing modules. Moreover, sets of multiple signal paths in which each signal path carries a single signal may be replaced by a single signal path that carries multiple signals multiplexed using a suitable multiplexing scheme. Similarly, a single signal path shown as carrying multiple signals may be replaced by multiple signal paths each carrying one signal, or carrying fewer signals than the single path shown.

Figure 8:
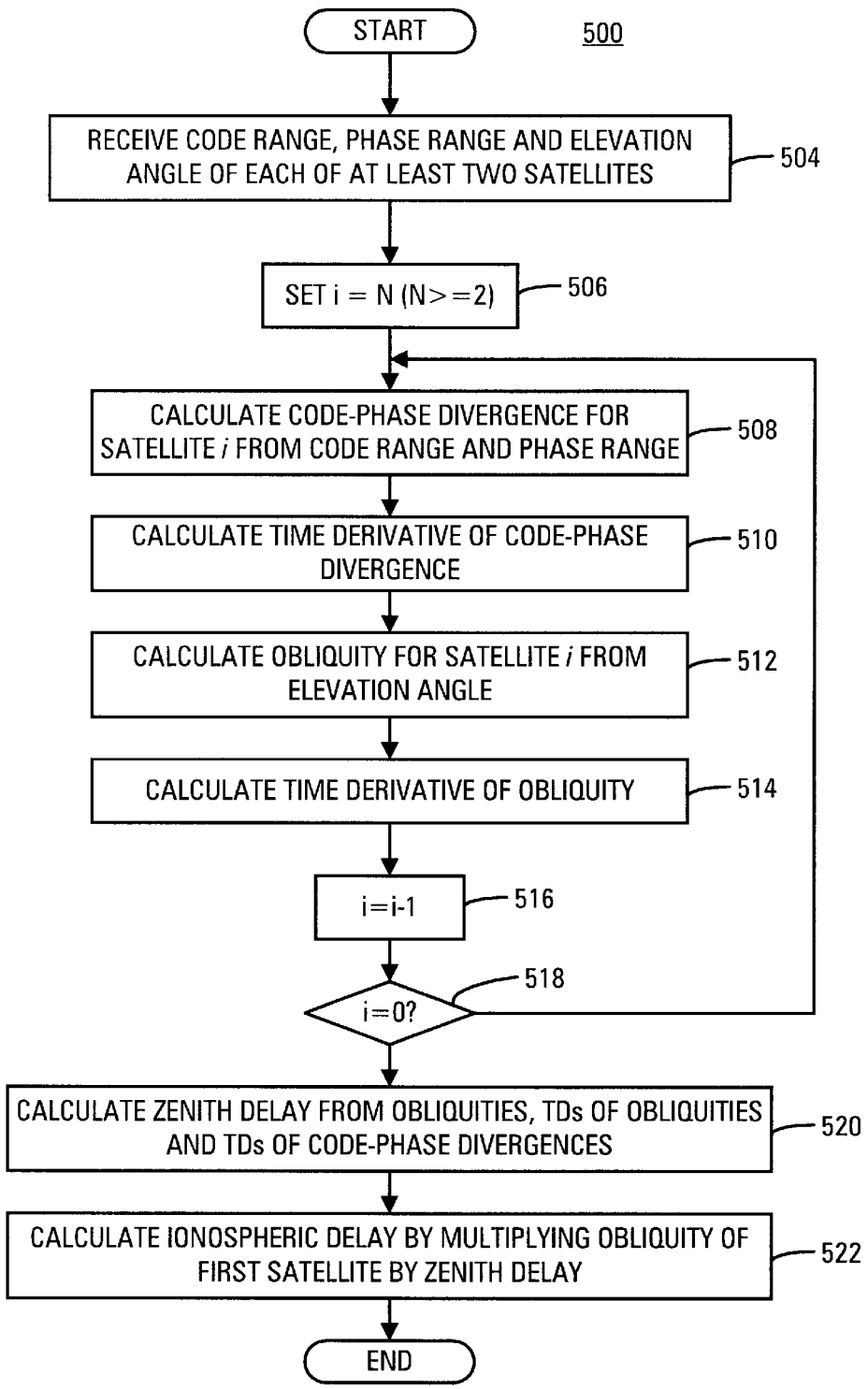
FIG. 8 is a flow chart showing a first embodiment of an autonomous ionospheric delay measuring method according to the invention.

A method 500 according to the invention for autonomously measuring the ionospheric delay of a GPS signal transmitted by a first satellite will now be described with reference to FIG. 8. The first satellite has an obliquity.

In the method, in process 504, a code range, a phase range and an elevation angle for each of at least two satellites are received. As noted above, these quantities are conventionally generated by GPS receivers.

In process 506, an index i is set equal to N, an integer that represents the number of satellites for which a code range, a phase range and an elevation angle are received. These satellites may include or may exclude the first satellite.

In process 508, the code-phase divergence for satellite i, the satellite indicated by the index i, is calculated by subtracting the phase range of satellite i from the code range of satellite i.

In process 510, the time derivative of the code-phase divergence of satellite i is calculated In process 512, the obliquity for satellite i is calculated from the elevation angle of this satellite, as described above. The obliquity is the secant of the angle at which the line of sight from the GPS receiver to the satellite i passes through the slab representing the ionosphere.

In process 514, the time derivative of the obliquity of satellite i is calculated.

In process 516, the index i is decremented by one.

In process 518, a test is performed to determine whether the index i is equal to zero. When the test result is NO, execution returns to process 508 so that the code-phase divergence, obliquity and their time derivatives can be calculated for another of the N satellites.

When the test result in process 518 is YES, execution advances to process 520, where the zenith delay is calculated from the obliquities, the time derivatives of the obliquities and the time derivatives of the code-phase divergences of the N satellites. The zenith delay may be calculated by solving two simultaneous equations when N=2 or by solving N simultaneous equations using a least-squares fitting method when N>2, as described above. This process may additionally yield the zenith delay time derivative, and the zenith delay time derivative may be used to smooth the zenith delay, also as described above. When the smoothed zenith delay is calculated, it is used instead of the zenith delay in the following process.

In process 522, the ionospheric delay of the signal transmitted by the first satellite is calculated. The zenith delay is multiplied by the obliquity of the first satellite to calculate the ionospheric delay.

Execution then ends.

The method 500 may additionally generate a corrected receiver clock bias that indicates a true error between a receiver time signal and the GPS system clock. When the method is used in this way, in process 504, a receiver clock bias is additionally received.

Use of the method to generate a corrected receiver clock bias when the receiver clock bias is calculated using the signal transmitted by the first satellite will now be described with reference to FIG. 9A. The ionospheric delay of the signal transmitted by the first satellite is measured as described above.

In process 524, a receiver time signal is generated.

In process 526, a receiver clock bias is generated. The receiver clock bias quantifies the difference between the receiver time signal and the GPS system clock. In this embodiment, the receiver clock bias is calculated from the GPS parameters of the satellite whose ionospheric delay was calculated in process 522.

In process 528, the receiver clock bias is corrected by subtracting the ionospheric delay from it to generate the corrected receiver clock bias.

Use of the method 500 to generate a corrected receiver clock bias when the receiver clock bias is calculated using the GPS signals transmitted by a set of P satellites will now be described with reference to FIG. 9B.

In process 529, a receiver time signal is generated.

In process 531, a receiver clock bias is generated. The receiver clock bias quantifies the difference between the receiver time signal and the GPS system clock. In this embodiment, the receiver clock bias is calculated from the GPS signals transmitted by the P satellites.

In process 533, an obliquity is calculated for each of the P satellites whose obliquity is not calculated by the ionospheric delay measurement method 500 described above with reference to FIG. 8.

In process 535, the ionospheric delay method 500 is performed with process 522 being performed repetitively to generate an ionospheric delay for each of the P satellites.

In process 537, the ionospheric delays are averaged to generate an average ionospheric delay.

In process 539, the receiver clock bias is corrected by subtracting the average ionospheric delay from it to generate the corrected receiver clock bias.

Figure 10:
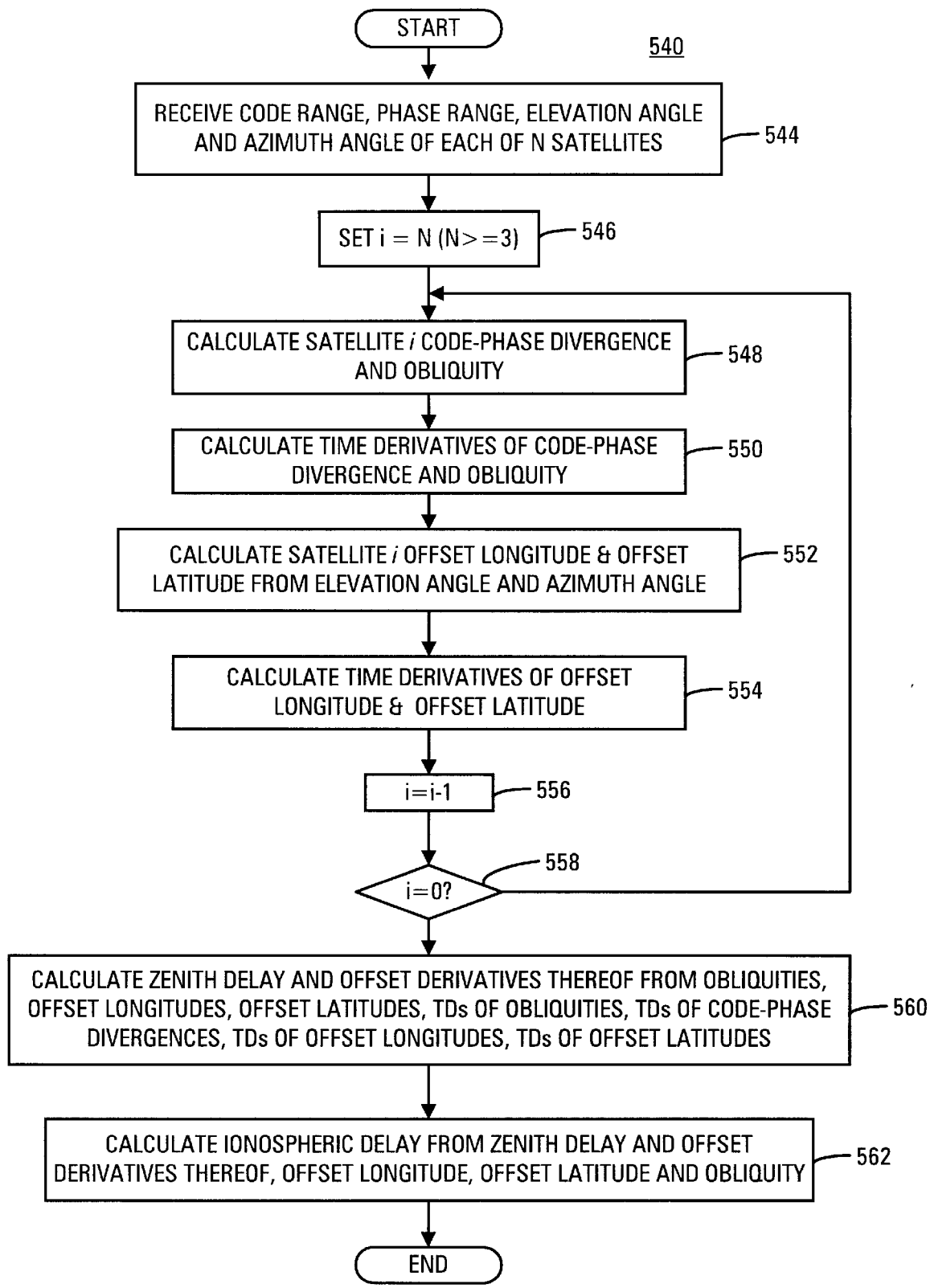
FIG. 10 is a flow chart showing a second embodiment of an autonomous ionospheric delay measuring method according to the invention.

A method 540 according to the invention for autonomously measuring the ionospheric delay of a GPS signal transmitted by a first satellite will now be described with reference to FIG. 10. The method 540 takes account of the variation of the ionospheric electron density, and, hence, the offset vertical delay, with the offset of the point at which the line of sight from the receiver to the satellite passes through the ionosphere.

In the method 540, in process 544, a code range, a phase range, an elevation angle and an azimuth angle are received for each of N satellites, where N is at least three. As noted above, these quantities are conventionally generated by GPS receivers.

In process 546, an index i is set equal to N, an integer that represents the number of satellites for which w a code range, a phase range, an elevation angle and an azimuth angle are received. These satellites may include or may exclude the first satellite.

In process 548, the code-phase divergence for satellite i, the satellite indicated by the index i, is calculated by subtracting the phase range of satellite i from the code range of satellite i. In addition, the obliquity for satellite i is calculated from the elevation angle of this satellite, as described above.

In process 550, the time derivatives of the code-phase divergence and of the obliquity of satellite i are calculated.

In process 552, the offset longitude and the offset latitude for satellite i are calculated from the elevation angle and the azimuth angle of satellite i. These calculations are conventional calculations performed in the GPS art.

In process 554, the time derivatives of the offset longitude and of the offset latitude of satellite i are calculated.

In process 556, the index i is decremented by one.

In process 558, a test is performed to determine whether the index i is equal to zero. When the test result is NO, execution returns to process 548 so that the code-phase divergence, obliquity, offset longitude and offset latitude and their time derivatives can be calculated for another of the N satellites.

When the test result in process 558 is YES, execution advances to process 560, where the zenith delay and the offset derivatives thereof are calculated from the obliquities, the offset longitudes, the offset latitudes, the time derivatives of the obliquities, the time derivatives of the offset longitudes, the time derivatives of the offset latitudes and the time derivatives of the code-phase divergences of the N satellites. The zenith delay may be calculated by solving three simultaneous equations when N=3 or by solving N simultaneous equations using a least-squares fitting method when N>3, as described above.

In process 562, the ionospheric delay of the signal transmitted by the first satellite is calculated from the zenith delay and the offset derivatives thereof, the offset longitude, the offset latitude and the obliquity of the first satellite.

Execution then ends.

Figure 9A:
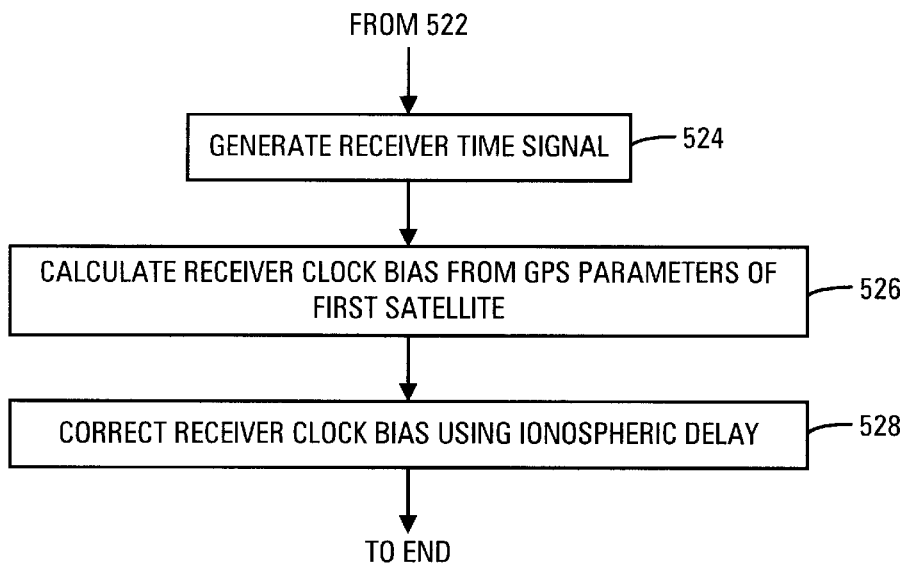
FIG. 9A is a flow chart illustrating the application of the method shown in FIG. 8 to correct a receiver clock bias generated using the GPS signal transmitted by a single satellite.
Figure 9B:
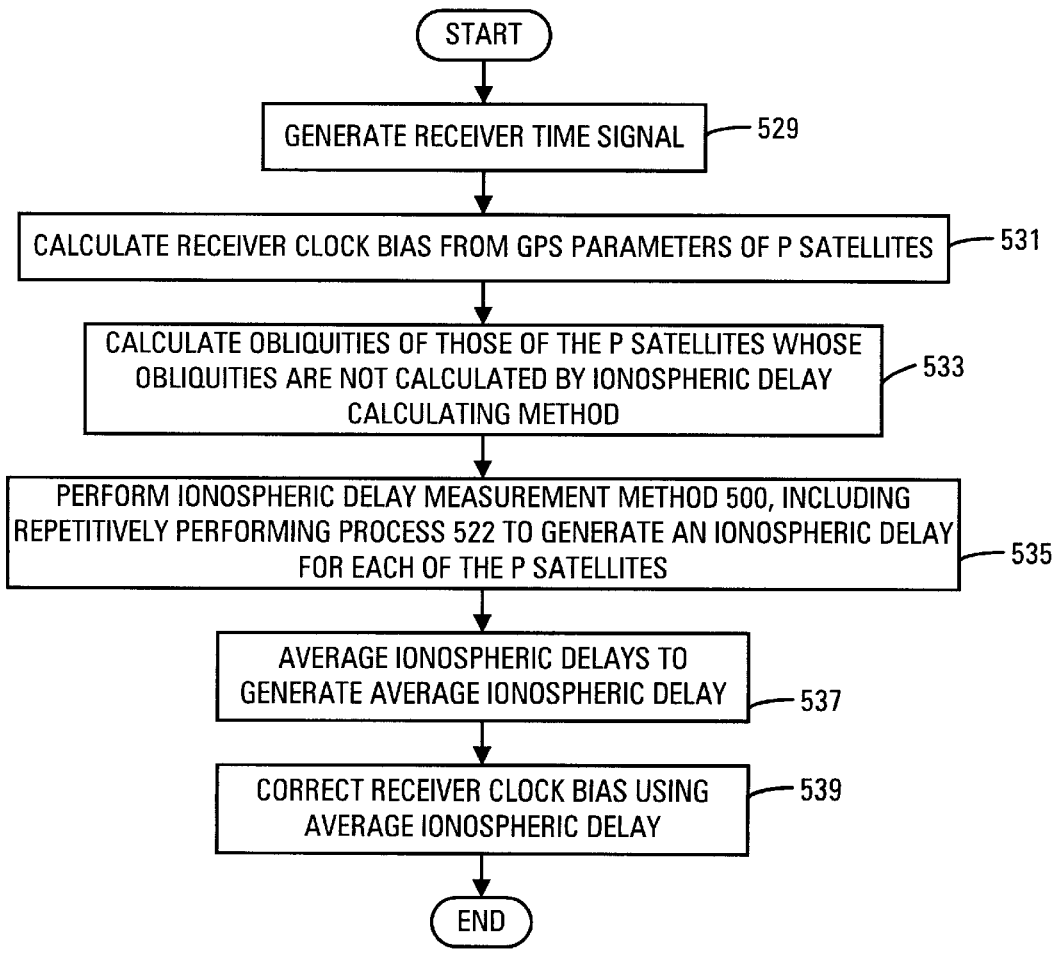
FIG. 9B is a flow chart illustrating the application of the method shown in FIG. 8 to correct a receiver clock bias generated using the GPS signals transmitted by a set of P satellites.

The method 550 may additionally be used to generate a corrected receiver clock bias that indicates a true error between a receiver time signal and the GPS system clock by performing the additional processes illustrated in FIG. 9A when the receiver clock bias is generated from the GPS signal received from only the first satellite, or in FIG. 9B when the receiver clock bias is generated from the GPS signals received from a set of P satellites.

The some of the mathematical concepts underlying the invention will now be described.

It is known that dispersion caused by free electric charges in the ionosphere changes the GPS code range and phase range at a given frequency in opposite directions. See, for example, J. A. Klobuchar, Ionospheric effects on GPS, *GLOBAL POSITIONING SYSTEM: THEORY AND APPLICATIONS*, 163 *PROGRESS IN ASTRONAUTICS AND AERONAUTICS*, 485–515.

In the conventional model in which the ionosphere is represented as a thin slab, the relationship between the code-phase divergence $\Delta_i$ for satellite i, measured in meters, the obliquity $F_i$ of the line of sight between the GPS receiver and the satellite and the total electron content I integrated along a vertical path through the ionosphere is given by:

$$\Delta_i = 0.325 \times F_i \times I + P_i + e_i \tag{1}$$

In equation (1), I is the total electron content integrated along a vertical path through the ionosphere in TEC units of $10^{16}$ electrons per m². $F_i$ is the obliquity given secant q, where q is the angle between the normal to the ionosphere and the line of sight from the receiver to the satellite. $P_i$ is equal to an integral number of L1 wavelengths and remains constant as long as phase-lock on the satellite signal is not lost. Receiver noise and multipath effects are represented by the noise term $e_i$. As noted above, the code-phase divergence $\Delta_i$ is easily calculated from the GPS parameters output by the GPS front end.

The zenith delay Z is proportional to I, the total electron content integrated along a vertical path through the ionosphere. Thus, the zenith delay in seconds can be obtained by rewriting equation (1) as:

$$\Delta_i = 2c \times F_i \times Z + P_i + e_i \tag{2}$$

where c is the velocity of light. The factor 2 is required because the ionospheric delay increases the code range and decreases the phase range by equal and opposite amounts.

Although the obliquity F can be determined easily for any satellite being tracked by the GPS front end, equation (2) cannot be used to calculate Z directly because of the unknown constant $P_i$. However, the apparatus and methods according to the invention use the time-dependence of the measured code-phase divergence to eliminate the constant $P_i$. Differentiating equation (2) gives, for a continuously-tracked satellite:

$$d\Delta_i/dt = 2c \times (Z \times dF_i/dt + F_i \times dZ/dt) \tag{3}$$

For brevity, this is rewritten as:

$$\Delta_i' = 2c \times (Z \times F_i' + F_i \times Z') \tag{4}$$

where $\Delta_i' = d\Delta_i/dt$, $F_i' = dF_i/dt$ and $Z' = dZ/dt$.

A typical GPS front end usually tracks more than four satellites simultaneously, and yields a sufficient number GPS parameters from which a sufficient number of obliquities, time derivatives of the obliquities and time derivatives of the code-phase divergences can be calculated to construct a set of simultaneous equations in the form of equation (4), one for each satellite.

For each satellite, the time derivative $\Delta_i'$ of the code-phase divergence is measured, and the values of the obliquity $F_i$, and the time derivative $F_i'$ of the obliquity can be calculated from the satellite ephemeris.

When the obliquities, time derivatives of the obliquities and time derivatives of the code-phase divergences obtained by tracking only two satellites, i.e., satellite 1 and satellite 2, are used to calculate Z, Z may be calculated by solving two simultaneous equations having the form of equation (4) and having Z and Z' as variables. The solution for Z is:

$$Z = (F_1 \Delta_2' - F_2 \Delta_1')/2c(F_1 F_2' - F_2 F_1'), \tag{5}$$

where c is the velocity of light.

The processing arrangement shown in FIG. 2 may be used to calculate Z using this relationship.

The solution for the zenith delay time derivative Z' is:

$$Z' = (F_1' \Delta_2' - F_2' \Delta_1')/2c(F_1' F_2 - F_2' F_1) \tag{6}$$

The processing arrangement shown in FIG. 2 with its inputs that receive the quantities F and F' interchanged, as shown in Table 1, may be used to calculate Z' using this relationship.

When the obliquities, time derivatives of the obliquities and time derivatives of the code-phase divergences obtained by tracking more than two satellites are used to calculate Z and Z', Z and Z' may be calculated by generating N simultaneous equations each having the form of equation (4) and having Z and Z' as variables. A least squares fit solution to the equations can then be calculated.

The model of the ionosphere on which equation (4) is based assumes that the ionosphere is uniform in the region that includes all the points at which the lines of sight from the receiver to the satellites pass through it. Since the ionosphere does not in practice have such uniformity, it is desirable to be able to calculate a value of the zenith delay at the point at which the line of sight passes through ionosphere. This value is called the offset vertical delay and depends on latitude and longitude. The variation of the offset vertical delay with longitude is determined based on the assumption that most of the zenith delay time derivative is the result of the earth rotating under an ionosphere distribution that changes relatively slowly in sun-fixed geocentric coordinates. The rate of change of the offset vertical delay with time in earth-fixed geocentric coordinates is then approximately equal to the rate of change with longitude multiplied by the rate of rotation of the earth.

The line of sight from the GPS receiver to the satellite passes through the assumed height of the ionosphere slab at a point that is offset in longitude and latitude from the position of the receiver. If the offset longitude and the offset latitude for the $i^{th}$ satellite are $\lambda_i$ and $\Phi_i$ respectively, and the variation of the zenith delay with the offset is expressed by the derivatives $dZ/d\lambda$ and $dZ/d\Phi$, respectively, in Cartesian coordinates, the code-phase divergence is given by:

$$\Delta_i = 2c \times F_i \times (Z + \lambda_i \times dZ/d\lambda + \Phi_i \times dZ/d\Phi) + P_i + e_i \tag{7}$$

where Z is the zenith delay overhead the GPS time receiver.

Differentiating equation (7), keeping only first order derivatives, and expressing $dZ/dt$ as $\Omega \times dZ/d\lambda$, where $\Omega$ is the rate of rotation of the earth, gives:

$$\Delta_i' = 2c \times (Z \times F_i' + dZ/d\lambda \times \{F_i \times [\Omega + d\lambda_i'] + \lambda_i \times F_i'\} + dZ/d\Phi \times \{F_i \times d\Phi_i' + \Phi_i \times F_i'\}) + s_i \tag{8}$$

Equation (8) has three unknowns, Z, $dZ/d\lambda$, and $dZ/d\Phi$. The GPS parameters obtained as a result of tracking N satellites can be used to construct N equations of the form of equation (8) having Z, $dZ/d\lambda$, and $dZ/d\Phi$ as their unknowns. The N equations can be written in the form of the single matrix equation:

$$V = W \times G \tag{9}$$

in which V is a 1×N column vector containing values of $d_i$, W is an N×3 matrix containing the calculated geometrical coefficients $a_i$, $b_i$ and $c_i$ for the N satellites, and G is a 1×3 column vector whose elements are the unknowns Z, $dZ/d\lambda$, and $dZ/d\Phi$. The values of $d_1$ are the measured values of $\Delta_i'$ for the N satellites, normalized by the factor $10^9/2c$.

In the matrix W, $$a_i = F_i'$$

$$b_i = F_i \times [\Omega + d\lambda_i'] + (\lambda_i \times F_i'), \text{ and}$$

$$c_1 = (F_i \times d\Phi_i') + (\Phi_i \times F_i')$$

When N is equal to or greater than three, the set of N equations can be inverted to obtain Z, $dZ/d\lambda$, and $dZ/d\Phi$. The least squares solution is described by the matrix equation:

$$G = [W^T W]^{-1} W^T V \tag{10}$$

(see Press et al., cited above).

Figure 7B:
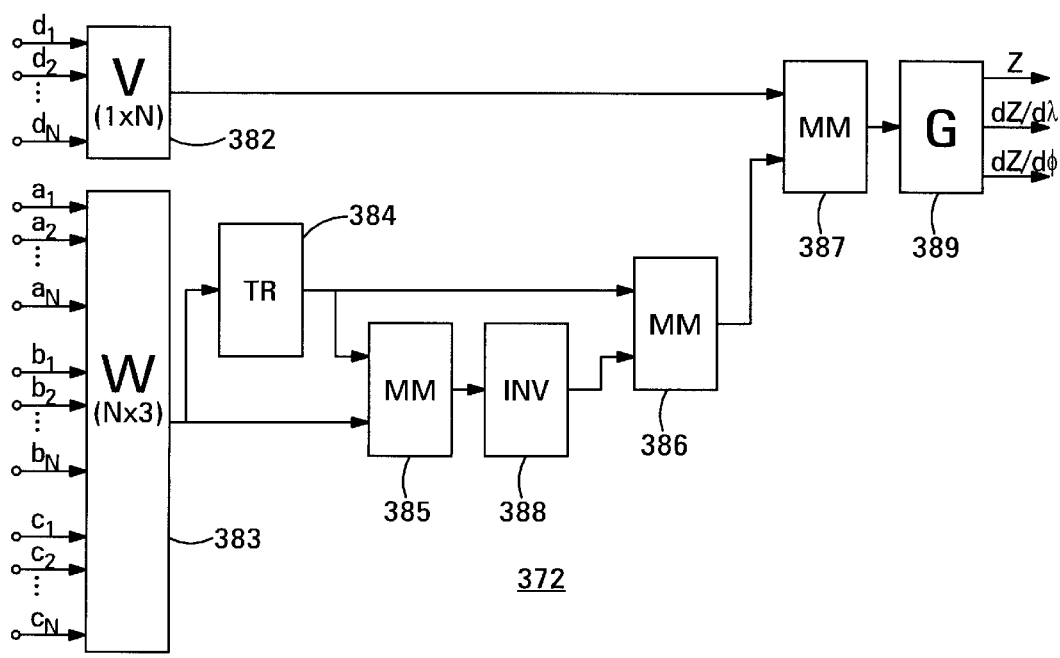
FIG. 7B is a block diagram of a first example of the equation solver module of the zenith delay and derivatives module shown in FIG. 6.
Figure 7C:
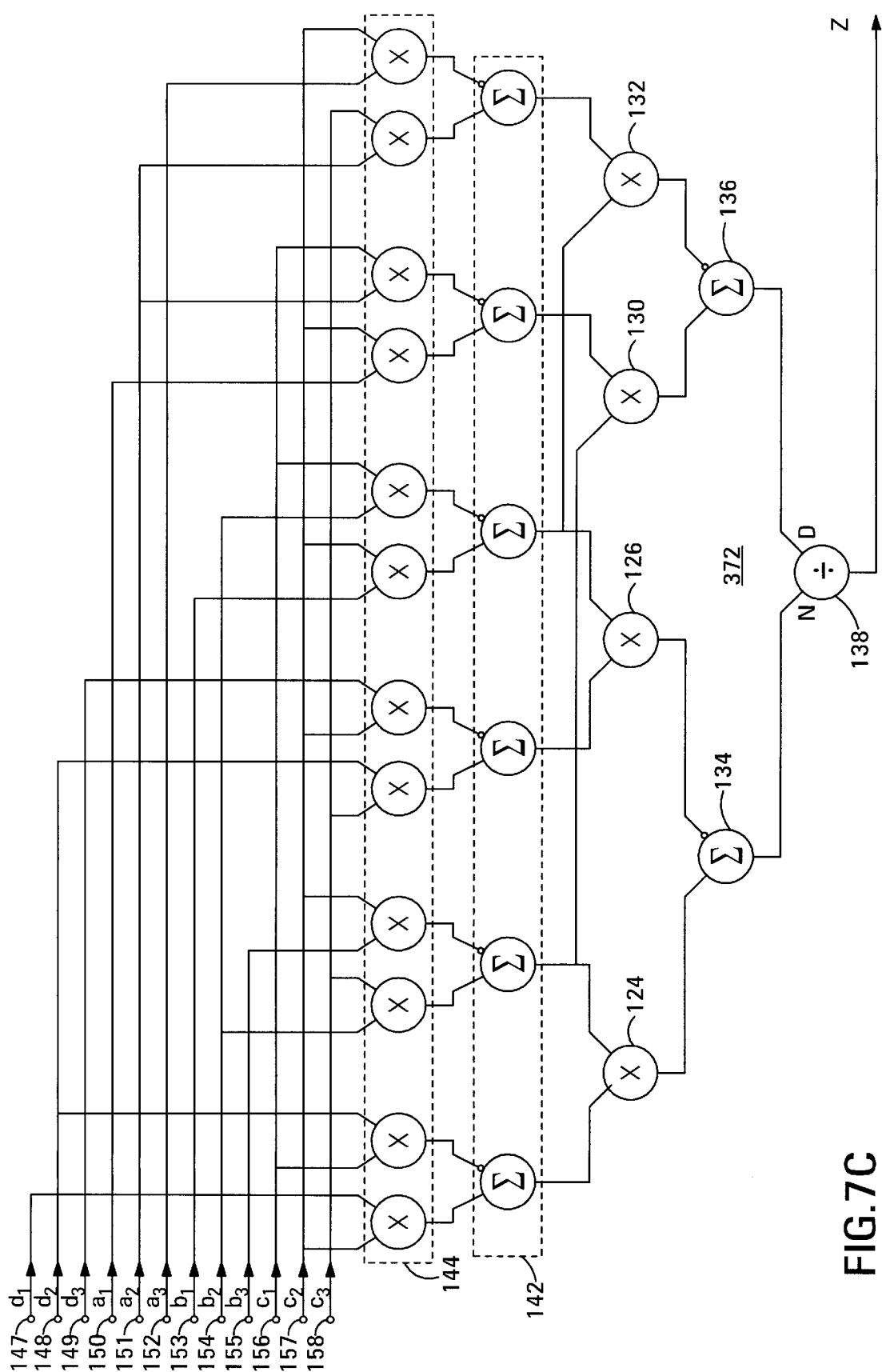
FIG. 7C is a block diagram of a second example of the equation solver module of the zenith delay and derivatives module shown in FIG. 6.

The expression for G may be calculated using the processing arrangement shown in FIG. 7B.

When N is equal to three, the set of three simultaneous equations can be solved to obtain Z, $dZ/d\lambda$, and $dZ/d\Phi$ as follows:

$$Z = \{(c_2 d_1 - c_1 d_2)(b_2 c_3 - b_3 c_2) - (c_3 d_2 - c_2 d_3)(b_1 c_2 - b_2 c_1)\}$$

$$/\{(a_1 c_2 - a_2 c_1)(b_2 c_3 - b_3 c_2) - (a_2 c_3 - a_3 c_2)(b_1 c_2 - b_2 c_1)\} \tag{11}$$

$$dZ/d\lambda = \{(c_2 d_1 - c_1 d_2)(a_2 c_3 - a_3 c_2)\} - \{(c_3 d_2 - c_2 d_3)(a_1 c_2 - a_2 c_1)\}$$

$$/\{(b_1 c_2 - b_2 c_1)(a_2 c_3 - a_3 c_2) - (b_2 c_3 - b_3 c_2)(a_1 c_2 - a_2 c_1)\} \tag{12}$$

$$dZ/d\Phi = \{(b_2 d_1 - b_1 d_2)(a_3 b_2 - a_2 b_3) - (a_3 d_2 - a_2 d_3)(a_2 b_1 - a_1 b_2)\}$$

$$/\{(a_3 b_2 - a_2 b_3)(a_2 c_1 - a_1 c_2) - (a_2 b_1 - a_1 b_2)(a_3 c_2 - a_2 c_3)\} \tag{13}$$

The expression for Z may be calculated using the processing arrangement shown in FIG. 7C. The expressions for $dZ/d\lambda$ and $dZ/d\Phi$ may each be calculated using the processing arrangement shown in FIG. 7C with the inputs arranged as shown in columns 2 or column 3, respectively, of Table 2.

Although this disclosure describes illustrative embodiments of the invention in detail, it is to be understood that the invention is not limited to the precise embodiments described, and that various modifications may be practiced within the scope of the invention defined by the appended claims.

I claim:

1. A method for measuring, autonomously and substantially in real-time, an ionospheric delay of a GPS signal transmitted by a first satellite having an obliquity, the method comprising:

receiving a code range, a carrier phase range and a satellite elevation angle for each of at least two satellites;

for each of the at least two satellites, calculating:
a code-phase divergence between the code range and the carrier phase range,
a time derivative of the code-phase divergence,
an obliquity from the satellite elevation angle, and
a time-derivative of the obliquity;

calculating a zenith delay from the obliquities, the time-derivatives of the obliquities and the time-derivatives of the code-phase divergences of the at least two satellites; and calculating the ionospheric delay by multiplying the obliquity of the first satellite and the zenith delay.

2. The method of claim 1, in which, when the first satellite is not one of the at least two satellites, the method additionally comprises calculating the obliquity of the first satellite.

3. The method of claim 1, in which:

the method additionally comprises:
calculating a zenith delay time derivative from the obliquities, the time-derivatives of the obliquities and the time-derivatives of the code-phase divergences of the at least two satellites, and
smoothing the zenith delay using the zenith delay time derivative to generate a smoothed zenith delay; and in calculating the ionospheric delay, the obliquity of the first satellite is multiplied by the smoothed zenith delay instead of by the zenith delay.

4. The method of claim 3, in which calculating the zenith delay time derivative includes:

subtracting products generated by cross multiplying the obliquities and the time derivatives of the obliquities to generate a first difference;

subtracting products generated by cross multiplying the time derivatives of the obliquities and the time derivatives of the code-phase divergences to generate a second difference; and dividing the second difference by the first difference to obtain the zenith delay time derivative.

5. The method of claim 3, in which calculating the zenith delay includes inverting a matrix of the obliquities, the time-derivatives of the obliquities and the time-derivatives of the code-phase divergences.

6. The method of claim 1, in which calculating the zenith delay includes:

subtracting products generated by cross multiplying the obliquities and the time derivatives of the code-phase divergences to generate a first difference;

subtracting products generated by cross multiplying the obliquities and the time derivatives of the obliquities to generate a second difference; and dividing the second difference by the first difference to obtain the zenith delay.

7. The method of claim 1, in which calculating the zenith delay includes inverting a matrix of the obliquities, the time-derivatives of the obliquities and the time-derivatives of the code-phase divergences.

8. The method of claim 1, in which:

in receiving a code range, a carrier phase range and a satellite elevation angle for each of at least two satellites, a code range, a carrier phase range and a satellite elevation angle is received for each of N satellites, where N is at least three; and calculating the zenith delay includes generating a least squares fit solution to N simultaneous equations having the obliquities, the time-derivatives of the obliquities and the time-derivatives of the code-phase divergences of the N satellites as coefficients and the zenith delay and a zenith delay time derivative as variables.

9. The method of claim 1, in which:

in receiving a code range, a carrier phase range and a satellite elevation angle for each of at least two satellites, a code range, a carrier phase range, a satellite elevation angle and additionally a satellite azimuth angle is received for each of at least three satellites;

the method additionally comprises calculating, for each of the at least three satellites:
an offset longitude and an offset latitude from the elevation angle and the azimuth angle,
a time derivative of the offset longitude, and
a time derivative of the offset latitude; in calculating a zenith delay:
the zenith delay is calculated from the obliquities, the time-derivatives of the obliquities and the time-derivatives of the code-phase divergences of the at least three satellites, and additionally from the offset longitudes, the offset latitudes, the time derivatives of the offset longitudes and the time derivatives of the offset latitudes of the at least three satellites, and
a derivative of the zenith delay with offset longitude and a derivative of the zenith delay with offset latitude are calculated from the obliquities, the time-derivatives of the obliquities and the time-derivatives of the code-phase divergences, the offset longitudes, the offset latitudes, the time derivatives of the offset longitudes and the time derivatives of the offset latitudes of the at least three satellites; and in calculating the ionospheric delay, the ionospheric delay is calculated from the zenith delay, the derivative of the zenith delay with offset longitude and the derivative of the zenith delay with offset latitude and additionally from the obliquity, the offset longitude and the offset latitude of the first satellite.

10. A method for generating, from a GPS signal transmitted by a first satellite, a corrected receiver clock bias signal corrected for ionospheric delay, the GPS signal including a clock signal referenced to a GPS system clock, the method comprising:

generating a receiver time signal;

generating a receiver clock bias signal quantifying a difference between the receiver time signal and the GPS system clock, the difference being subject to an error caused by the ionospheric delay;

calculating the ionospheric delay of the GPS signal transmitted by the first satellite using the autonomous ionospheric delay measuring method of claim 1; and subtracting the ionospheric delay from the receiver clock bias signal to generate the corrected receiver clock bias signal.

11. A method for generating, from GPS signals transmitted by a set of P satellites, a corrected receiver clock bias signal corrected for ionospheric delay, the GPS signals each including a clock signal referenced to a GPS system clock, the method comprising:

generating a receiver time signal in response to the GPS signals;

generating a receiver clock bias signal quantifying a difference between the receiver time signal and the GPS system clock, the difference being subject to an error caused by the ionospheric delay;

performing the autonomous ionospheric delay measuring method of claim 1, including repetitively calculating the ionospheric delay for each of the P satellites, to measure an ionospheric delay for each of the P satellites;

averaging the ionospheric delays to generate an average ionospheric delay;

calculating an obliquity for each of the satellites in the set whose obliquity is not calculated by the ionospheric delay calculating method; and subtracting the average ionospheric delay from the receiver clock bias signal to generate the corrected receiver clock bias signal.

12. An autonomous, substantially real-time ionospheric delay measuring apparatus for calculating an ionospheric delay of a GPS signal transmitted by a first satellite, the first satellite having an obliquity, and received by a GPS front end capable of receiving a GPS signal from each of at least two satellites and configured to calculate, from each GPS signal, a code range, a carrier phase range and a satellite elevation angle, the apparatus comprising:

a divergence and obliquity module for each of the at least two satellites, each divergence and obliquity module being connected to receive from the GPS front end the code range, the carrier phase range and the satellite elevation angle of one of the at least two satellites, and including:
a code-phase divergence module structured to calculate a code-phase divergence between the code range and the carrier phase range,
an obliquity module structured to calculate an obliquity from the satellite elevation angle,
time derivative modules structured to calculate a time derivative of the code-phase divergence and a time derivative of the obliquity;

a zenith delay module that receives the obliquities, the time-derivatives of the obliquities and the time-derivatives of the code-phase divergences of the at least two satellites and is structured to calculate a zenith delay therefrom; and an ionospheric delay module that calculates the ionospheric delay by multiplying the obliquity of the first satellite and the zenith delay.

13. The apparatus of claim 12, additionally comprising an additional obliquity module for calculating the obliquity of the first satellite when the first satellite is not one of the at least two satellites.

14. The apparatus of claim 12, in which:
the zenith delay module is additionally structured to calculate a zenith delay time derivative from the obliquities, the time-derivatives of the obliquities and the time-derivatives of the code-phase divergences of the at least two satellites;
the apparatus additionally comprises a smoothing module that receives the zenith delay and the time derivative thereof and is structured to generate a smoothed zenith delay by smoothing the zenith delay using the zenith delay time derivative; and
the ionospheric delay module calculates the ionospheric delay by multiplying the obliquity and the smoothed zenith delay instead of the zenith delay.

15. The apparatus of claim 14, in which the zenith delay module includes:
a first pair multiplying modules that generates a first pair of products, the first pair of multiplying modules being connected to receive one of (a) the obliquities and the time derivatives of the code-phase divergences, and (b) the obliquities and the time derivatives of the obliquities;
a first subtracting module that subtracts one of the first pair of products from the other to generate a first difference;
a second pair multiplying modules that generates a second pair of products the second pair of multiplying modules being connected to receive one of (a) the obliquities and the time derivatives of the obliquities, and (b) the time derivatives of the obliquities and the time derivatives of the code-phase divergences;
a second subtracting module that subtracts one of the second pair of products from the other to generate a second difference;
a divider that divides the second difference by the first difference to generate the zenith delay when quantities (a) are received by the first and second pairs of multiplying modules, and to generate the zenith delay time derivative when quantities (b) are received by the first and second pairs of multiplying modules.

16. The apparatus of claim 14, in which the zenith delay module includes a matrix inverter that inverts a matrix of the obliquities, the time-derivatives of the obliquities and the time-derivatives of the code-phase divergences.

17. The apparatus of claim 12, in which the zenith delay module includes:
a first pair multiplying modules that generates a first pair of products, the first pair of multiplying modules being connected to receive the obliquities and the time derivatives of the code-phase divergences;
a first subtracting module that subtracts one of the first pair of products from the other to generate a first difference;
a second pair multiplying modules that generates a second pair of products the second pair of multiplying modules being connected to receive the obliquities and the time derivatives of the obliquities;
a second subtracting module that subtracts one of the second pair of products from the other to generate a second difference;
a divider that divides the second difference by the first difference to generate the zenith delay.

18. The apparatus of claim 12, in which the zenith delay module includes a matrix inverter that inverts a matrix of the obliquities, the time-derivatives of the obliquities and the time-derivatives of the code-phase divergences.

19. The apparatus of claim 12, in which the GPS front-end is capable of receiving a GPS signal from each of N satellites, where N is at least three, and in which:
the apparatus additionally includes a divergence and obliquity module for each of the N satellites; and
the zenith delay module includes a matrix circuit that generates a least squares fit solution to N simultaneous equations having the obliquities, the time-derivatives of the obliquities and the time-derivatives of the code-phase divergences of the N satellites as coefficients and the zenith delay and a zenith delay time derivative as variables.

20. The apparatus of claim 12, in which the GPS front-end is capable of receiving a GPS signal from each of at least three satellites and is additionally structured to calculate an azimuth angle from each GPS signal;

the apparatus includes a divergence and obliquity module for each of the at least three satellites, each divergence and obliquity module additionally being connected to receive the azimuth angle for one of the satellites from the GPS front end, each divergence and obliquity module additionally including:

an offset module that calculates an offset longitude and an offset latitude from the elevation angle and the azimuth angle, and additional time derivative modules structured to calculate a time derivative of the offset longitude and a time derivative of the offset latitude;

the zenith delay module is structured to calculate the zenith delay, a derivative of the zenith delay with offset longitude and a derivative of the zenith delay with offset latitude from the obliquities, the time-derivatives of the obliquities and the time-derivatives of the code-phase divergences of the at least three satellites, and additionally from the offset longitudes, the offset latitudes, the time derivatives of the offset longitudes and the time derivatives of the offset latitudes of the at least three satellites; and the ionospheric delay module is structured to calculate the ionospheric delay from the zenith delay, the derivative of the zenith delay with offset longitude and the derivative of the zenith delay with offset latitude and additionally from the obliquity, the offset longitude and the offset latitude of the first satellite.

21. A GPS time receiver that operates in response to a GPS signal transmitted by a first satellite to generate a corrected receiver clock bias signal corrected for ionosphere delay, the GPS signal including a clock signal referenced to a GPS system clock, the GPS time receiver comprising:

a GPS front-end including a receiver clock that generates a receiver time signal, the GPS front end being structured to:

receive a GPS signal from each of at least two satellites, calculate a code range, a carrier phase range and a satellite elevation angle for each of the at least two satellites, and generate a receiver clock bias signal quantifying a difference between the receiver time signal and the GPS system clock, the difference being subject to an error caused by the ionospheric delay;

the autonomous ionospheric delay measuring apparatus of claim 1 connected to receive from the GPS front end the code range, carrier phase range and satellite elevation angle for each of the at least two satellites; and a receiver clock bias generating module connected to receive the ionospheric delay from the autonomous ionospheric delay measuring apparatus and the receiver clock bias signal from the GPS front end, and that operates to subtract the ionospheric delay from the receiver clock bias signal to generate the corrected receiver clock bias signal.

22. A GPS time receiver that operates in response to GPS signals transmitted by a set of P satellites to generate a corrected receiver clock bias signal corrected for ionosphere delay, the GPS signals each including a clock signal referenced to a GPS system clock, the GPS time receiver comprising:

a GPS front-end including a receiver clock that generates a receiver time signal, the GPS front end being structured to:

receive the GPS signals from each of the P satellites, calculate a code range, a carrier phase range and a satellite elevation angle for each of at least two of the satellites, and generate a receiver clock bias signal quantifying a difference between the receiver time signal and the GPS system clock, the difference being subject to an error caused by the ionospheric delay;

the autonomous ionospheric delay measuring apparatus of claim 1 connected to receive from the GPS front end the code range, carrier phase range and satellite elevation angle for each of the at least two satellites, and operating to generate an average ionospheric delay for the P satellites;

an additional obliquities module connected to receive the elevation angles from the GPS front end and structured to calculate an obliquity for each of the P satellites whose obliquity is not calculated by the autonomous ionospheric delay measuring apparatus; and a receiver clock bias generating module connected to receive the average ionospheric delay from the autonomous ionospheric delay measuring apparatus and the receiver clock bias signal from the GPS front end, and that operates to subtract the ionospheric delay from the receiver clock bias signal to generate the corrected receiver clock bias signal.

* * * * *